United States Patent
Kimura et al.

(10) Patent No.: US 12,359,740 B2
(45) Date of Patent: Jul. 15, 2025

(54) VALVE DEVICE

(71) Applicant: DENSO CORPORATION, Kariya (JP)

(72) Inventors: Shota Kimura, Kariya (JP); Ryo Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 25 days.

(21) Appl. No.: 18/468,925

(22) Filed: Sep. 18, 2023

(65) Prior Publication Data

US 2024/0003458 A1    Jan. 4, 2024

Related U.S. Application Data

(63) Continuation of application No. PCT/JP2022/015520, filed on Mar. 29, 2022.

(30) Foreign Application Priority Data

Apr. 21, 2021    (JP) ................................ 2021-071790

(51) Int. Cl.
  *F16K 31/04* (2006.01)
  *F16K 3/06* (2006.01)
  *F16K 11/074* (2006.01)

(52) U.S. Cl.
  CPC ............ *F16K 31/04* (2013.01); *F16K 3/06* (2013.01); *F16K 11/074* (2013.01); *F16K 31/043* (2013.01)

(58) Field of Classification Search
  CPC .......... F16K 31/04; F16K 3/06; F16K 11/074; F16K 31/043
  See application file for complete search history.

(56) References Cited

U.S. PATENT DOCUMENTS

| | | | | |
|---|---|---|---|---|
| 3,834,416 A | * | 9/1974 | Parkison | .................. F16K 3/08 |
| | | | | 137/454.2 |
| 4,889,157 A | * | 12/1989 | Bergmann | ............ F16K 27/045 |
| | | | | 137/550 |
| 5,022,631 A | * | 6/1991 | Wagner | ................. F16K 27/045 |
| | | | | 251/185 |

(Continued)

FOREIGN PATENT DOCUMENTS

JP    2002257248 A    9/2002

OTHER PUBLICATIONS

U.S. Appl. No. 18/190,514 to Ryo Sano, filed Mar. 27, 2023 (48 pages).
U.S. Appl. No. 18/190,565 to Takuya Hamada, filed Mar. 27, 2023 (50 pages).

(Continued)

*Primary Examiner* — Craig M Schneider
*Assistant Examiner* — Christopher D Ballman
(74) *Attorney, Agent, or Firm* — Nixon & Vanderhye P.C.

(57) ABSTRACT

In a valve device, a rotor is configured to increase or decrease an opening degree of at least one passage hole formed at a stationary disk in response to rotation of a shaft. The rotor includes a drive disk and a lever while the lever is fixed to the drive disk and couples between the drive disk and the shaft and enables integral rotation of the drive disk and the shaft. The drive disk has a drive-side insertion hole through which the shaft is inserted. A hole diameter of the drive-side insertion hole is larger than a shaft diameter of the shaft, and a hole diameter of at least one of two end portions of the drive-side insertion hole, which are opposite to each other in the axial direction, is larger than a smallest hole diameter of the drive-side insertion hole.

9 Claims, 16 Drawing Sheets

(56) References Cited

U.S. PATENT DOCUMENTS

| | | | | |
|---|---|---|---|---|
| 5,044,605 | A | * | 9/1991 | Korfgen ................ F16K 27/045 251/304 |
| 5,143,349 | A | * | 9/1992 | Korfgen .................... F16K 3/08 251/304 |
| 5,316,042 | A | * | 5/1994 | Lim .......................... F16K 3/08 137/625.11 |
| 7,316,384 | B2 | * | 1/2008 | Sekiya ................ F16K 11/0743 251/129.11 |
| 9,803,759 | B2 | * | 10/2017 | Bachofer ............ F16K 11/0743 |
| 9,874,284 | B2 | * | 1/2018 | Bachofer ............ F16K 11/0746 |
| 11,873,753 | B2 | * | 1/2024 | Higuchi ................. B60K 11/02 |
| 2006/0144450 | A1 | * | 7/2006 | Hasegawa ........ H01M 8/04089 137/625.46 |
| 2015/0233476 | A1 | * | 8/2015 | Bachofer ............... F16J 15/447 251/319 |
| 2022/0090700 | A1 | | 3/2022 | Hamada et al. |
| 2022/0186840 | A1 | | 6/2022 | Kimura et al. |
| 2024/0003458 | A1 | * | 1/2024 | Kimura ................. F16K 11/074 |

OTHER PUBLICATIONS

U.S. Appl. No. 18/469,004 to Atsushi Tanaka, filed Sep. 18, 2023 (63 pages).

U.S. Appl. No. 18/469,073 to Yoshitada Aono, filed Sep. 18, 2023 (63 pages).

U.S. Appl. No. 18/469,291 to Ryo Sano, filed Sep. 18, 2023 (54 pages).

U.S. Appl. No. 18/469,283 to Naoki Asano, filed Sep. 18, 2023 (50 pages).

U.S. Appl. No. 18/468,972 to Takuya Hamada, filed Sep. 18, 2023 (53 pages).

U.S. Appl. No. 18/469,218 to Takehito Mizunuma, filed Sep. 18, 2023 (61 pages).

* cited by examiner

# VALVE DEVICE

CROSS REFERENCE TO RELATED APPLICATIONS

This application is a continuation application of International Patent Application No. PCT/JP2022/015520 filed on Mar. 29, 2022, which designated the U.S. and claims the benefit of priority from Japanese Patent Application No. 2021-071790 filed on Apr. 21, 2021. The entire disclosures of all of the above applications are incorporated herein by reference.

TECHNICAL FIELD

The present disclosure relates to a valve device.

BACKGROUND

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a drive disk (serving as a rotor) and a shaft. The drive disk and the shaft are configured to rotate integrally in a state where the shaft is inserted through the drive disk.

In the valve device, since a hole diameter of an insertion hole of the drive disk, through which the shaft is inserted, is larger than a shaft diameter of the shaft, variations in an opening degree of a passage hole can easily occur due to a deviation (misalignment) between a rotational center of the drive disk and a central axis of the shaft. The variations in the opening degree of the passage hole will cause variations in the flow rate of the fluid, which flows through the valve device, so that the variations in the opening degree of the passage hole are not desirable.

SUMMARY

This section provides a general summary of the disclosure, and is not a comprehensive disclosure of its full scope or all of its features.

According to the present disclosure, there is provided a valve device including a housing, a stationary disk, a shaft and a rotor. The rotor includes a drive disk and a lever. The drive disk has a drive-side insertion hole through which the shaft is inserted. An outer diameter of an inserted portion of the shaft, which is inserted through the drive-side insertion hole, is defined as a shaft diameter. A hole diameter of the drive-side insertion hole is larger than the shaft diameter, and a hole diameter of at least one of two end portions of the drive-side insertion hole, which are opposite to each other in the axial direction, is larger than a smallest hole diameter of the drive-side insertion hole.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
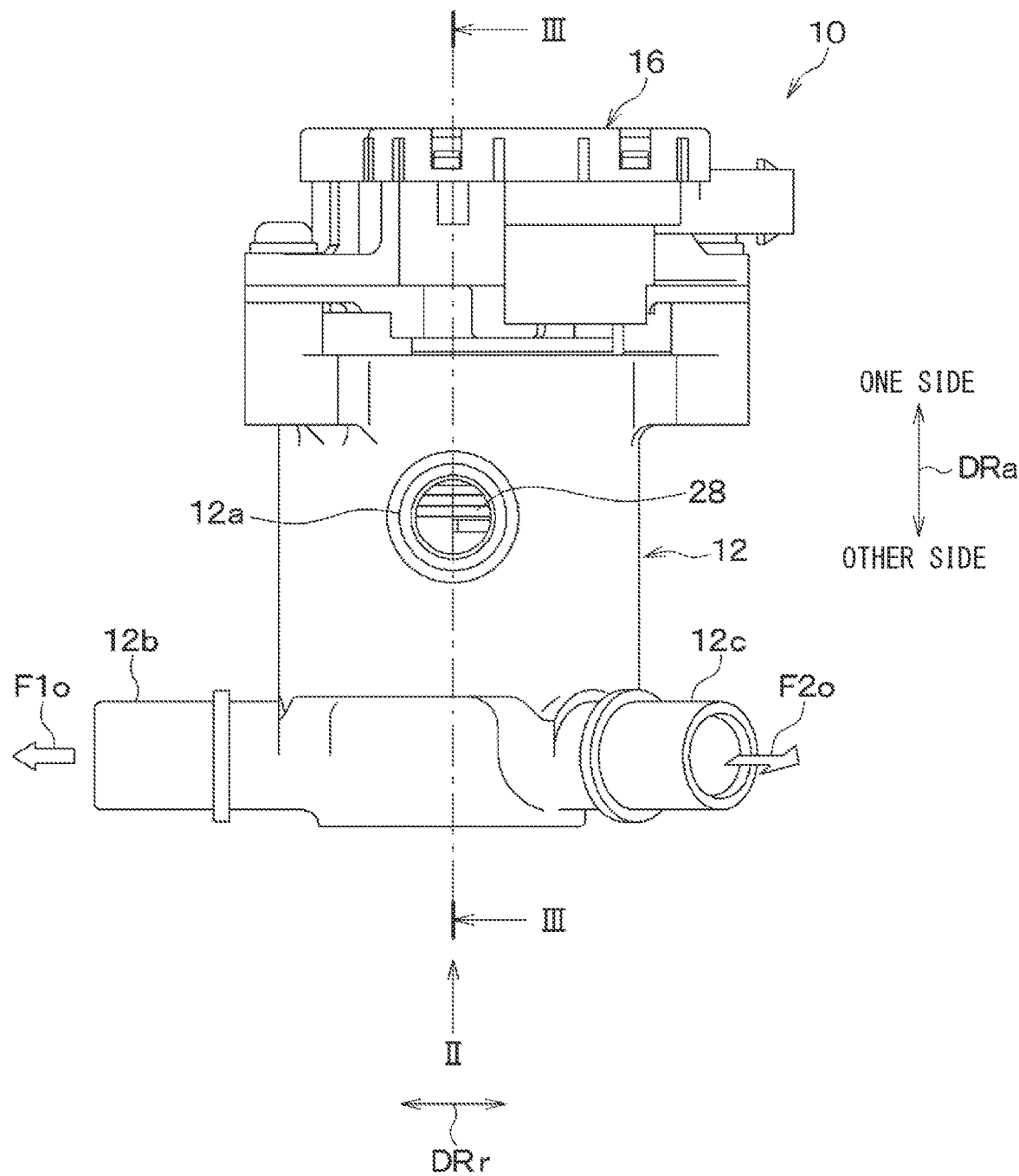
FIG. 1 is a front view of a valve device according to a first embodiment.

A flow rate control valve is an example of a valve device. For example, one previously proposed flow rate control valve includes: a valve element; a drive device which drives the valve element; a speed reducer which is placed between the valve element and the drive device and increases a drive torque outputted from the drive device; and a return spring which urges the valve element that is driven through the speed reducer. The valve element of this flow rate control valve includes a drive disk (serving as a rotor) and a shaft. The drive disk and the shaft are configured to rotate integrally in a state where the shaft is inserted through the drive disk.

In the valve device, since a hole diameter of an insertion hole of the drive disk, through which the shaft is inserted, is larger than a shaft diameter of the shaft, variations in an opening degree of a passage hole can easily occur due to a deviation (misalignment) between a rotational center of the drive disk and a central axis of the shaft. The variations in the opening degree of the passage hole will cause variations in the flow rate of the fluid, which flows through the valve device, so that the variations in the opening degree of the passage hole are not desirable.

In view of the above point, it is conceivable to reduce the hole diameter of the insertion hole of the drive disk. However, in such a case, when the shaft is tilted due to some reason, the drive disk is also tilted along with the shaft. Thereby, a degree of close contact between the drive disk and a stationary disk having the passage hole is disadvantageously decreased. The change in the posture (also referred to as orientation or attitude) of the shaft described above is not desirable since it will cause unintended leakage of the fluid at the valve device. The above finding is made by the inventors of the present application through the diligent study of the inventors of the present application.

According to one aspect of the present disclosure, there is provided a valve device including:
  a housing that forms a fluid passage at an inside of the housing, wherein the fluid passage is configured to conduct a fluid through the fluid passage;
  a stationary disk that is shaped in a plate form and is fixed at the inside of the housing, wherein the stationary disk has at least one passage hole which is configured to conduct the fluid through the at least one passage hole;
  a drive device that is configured to output a rotational force;
  a shaft that is configured to be rotated about a central axis, which is predetermined, by the rotational force;
  a rotor that is configured to increase or decrease an opening degree of the at least one passage hole in response to rotation of the shaft; and
  an urging member that is configured to urge the rotor against the stationary disk, wherein:
  the rotor includes:
    a drive disk that is shaped in a plate form and is configured to slide relative to the stationary disk; and
    a lever that is fixed to the drive disk and couples between the drive disk and the shaft to enable integral rotation of the drive disk and the shaft in a state where the drive disk is displaceable in an axial direction of the shaft;
  the drive disk has a drive-side insertion hole through which the shaft is inserted;
  an outer diameter of an inserted portion of the shaft, which is inserted through the drive-side insertion hole, is defined as a shaft diameter; and
  a hole diameter of the drive-side insertion hole is larger than the shaft diameter, and a hole diameter of at least one of two end portions of the drive-side insertion hole, which are opposite to each other in the axial direction, is larger than a smallest hole diameter of the drive-side insertion hole.

With this configuration, the position of the rotational center of the drive disk is limited at a location of the drive-side insertion hole, at which the hole diameter is the smallest, so that the deviation between the rotational center of the drive disk and the central axis of the shaft is limited. In addition, since the hole diameter of the at least one of the two end portions of the drive-side insertion hole, which are opposite to each other in the axial direction, is larger than the smallest hole diameter of the drive-side insertion hole, a tiltable range of the shaft relative to the rotor is increased. Thereby, even when the shaft is tilted due to some reason, a sufficient degree of close contact between the drive disk and the stationary disk can be ensured. Furthermore, since the rotor is urged against the stationary disk by the urging member, the posture of the drive disk can be maintained to the posture at which the drive disk contacts the stationary disk.

Thus, according to the valve device of the present disclosure, the unintended leakage of the fluid caused by the change in the posture of the shaft can be limited while the deviation between the rotational center of the drive disk and the central axis of the shaft is limited.

Hereinafter, embodiments of the present disclosure will be described with reference to the drawings. In the following embodiments, the same reference signs may be assigned to portions that are the same as or equivalent to those described in the preceding embodiment(s), and the description thereof may be omitted. Furthermore, when only a portion of any one of the components is described in the embodiment, the description of the component described in the preceding embodiment can be applied to the rest of the component. The following embodiments may be partially combined with each other as long as the combination does not cause any trouble, even if not explicitly stated.

First Embodiment

Hereinafter, a first embodiment of the present disclosure will be described with reference to FIGS. 1 to 17. In the present embodiment, there will be described an example where a valve device 10 of the present disclosure is applied to a temperature adjusting device that is for air conditioning of a vehicle cabin and also for temperature adjustment of a battery at an electric vehicle. The valve device 10, which is used in the temperature adjusting device of the electric vehicle, is required to execute fine adjustment of the temperature according to a state of the vehicle cabin and a state of the battery and is required to more accurately adjust a flow rate of a fluid in comparison to a coolant circuit of an internal combustion engine.

The valve device 10 shown in FIG. 1 is applied to a fluid circuit in which the fluid (in this example, coolant) for adjusting the temperature of the vehicle cabin and the temperature of the battery is circulated. The valve device 10 can increase or decrease the flow rate of the fluid in a flow path through the valve device 10 in the fluid circuit, and the valve device 10 can also shut off the flow of the fluid in the flow path. For example, LLC, which contains ethylene glycol, is used as the fluid. Here, LLC stands for Long Life Coolant.

Figure 2:
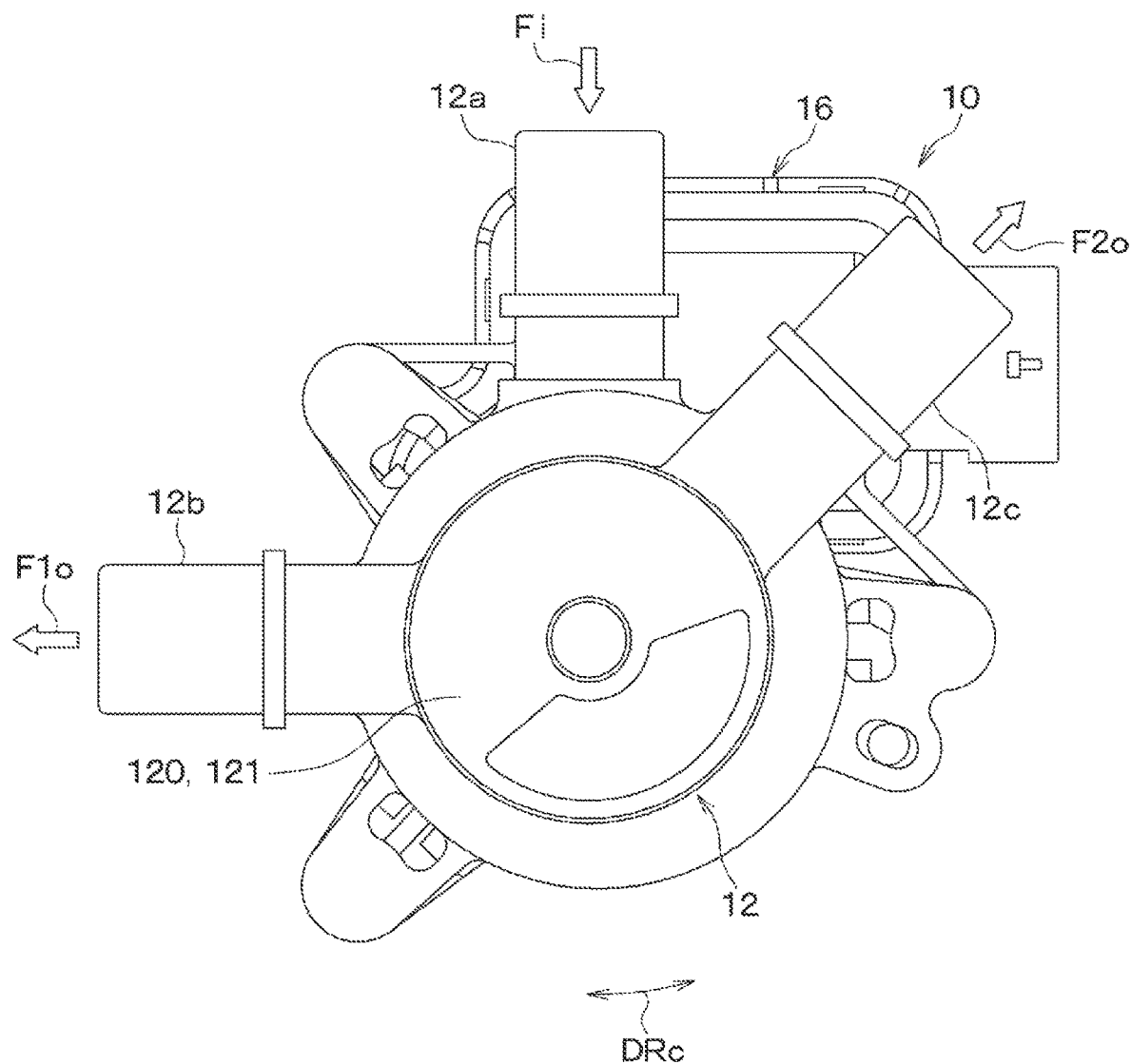
FIG. 2 is a bottom view of the valve device viewed in a direction of an arrow II in FIG. 1.

As shown in FIGS. 1 and 2, the valve device 10 includes a housing 12 that forms a fluid passage at an inside of the housing 12 to conduct the fluid therethrough. The valve device 10 is a three-way valve and is formed such that an inlet 12a for receiving the fluid, a first outlet 12b for outputting the fluid, and a second outlet 12c for outputting the fluid are formed at the housing 12. The valve device 10 functions not only as a flow path switching valve but also functions as a flow rate adjusting valve that adjusts a flow rate ratio between a flow rate of the fluid, which flows from the inlet 12a to the first outlet 12b, and a flow rate of the fluid, which flows from the inlet 12a to the second outlet 12c.

The valve device 10 is a disk valve that performs a valve opening/closing operation by rotating a valve element shaped in a circular disk form about a central axis CL of a shaft 18 described later. In the present embodiment, description of various structures will be made while assuming that a direction, which is along the central axis CL of the shaft 18 described later, is an axial direction DRa, and a radial direction of the central axis CL, which is perpendicular to the axial direction DRa, is a radial direction DRr. Also, in the present embodiment, the description of the various structures will be made while assuming that a circumferential direction around the central axis CL is a circumferential direction DRc.

Figure 3:
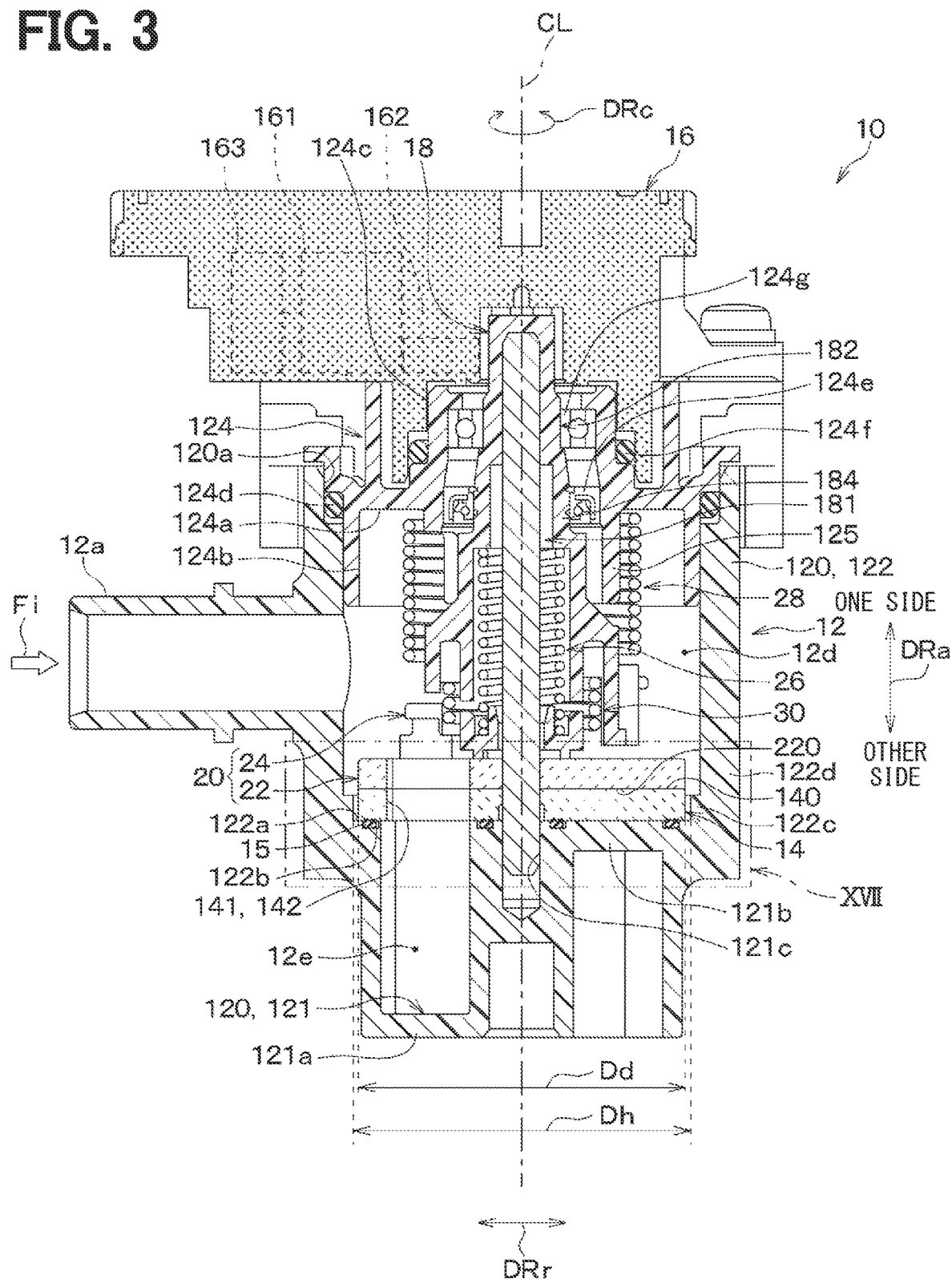
FIG. 3 is a cross-sectional view taken along line III-III in FIG. 1.

As shown in FIG. 3, in the valve device 10, a stationary disk 14, a drive device 16, the shaft 18, a rotor 20, a compression spring 26, a first torsion spring 28 and a second torsion spring 30 are received at the inside of the housing 12. Furthermore, in the valve device 10, the drive device 16 is placed at an outside of the housing 12.

The housing 12 is a non-rotatable member that does not rotate. The housing 12 is made of, for example, a resin material. The housing 12 has: a main body 120, which is shaped in a bottomed tubular form and extends in the axial direction DRa; and a main-body cover 124 which closes an opening 120a of the main body 120.

The main body 120 has: a bottom wall 121 which forms a bottom surface; and a peripheral wall 122, which circumferentially surrounds the central axis CL. The bottom wall 121 and the peripheral wall 122 are formed integrally in one-piece as an integral molded product.

Two stepped portions (recesses), which correspond to two passage holes 141, 142, respectively, of the stationary disk 14 described later, are formed at the bottom wall 121. That is, each of two portions of the bottom wall 121, which are opposed to the passage holes 141, 142, respectively, of the stationary disk 14, is further spaced from the main-body cover 124 than a portion of the bottom wall 121, which is not opposed to the passage holes 141, 142 of the stationary disk 14.

The bottom wall 121 has: two opposing portions 121a, which are opposed to the passage holes 141, 142, respectively, of the stationary disk 14; and a non-opposing portion 121b, which is not opposed to each of the passage holes 141, 142 of the stationary disk 14. The opposing portions 121a of the bottom wall 121 are largely spaced from the stationary disk 14, and the non-opposing portion 121b of the bottom wall 121 is adjacent to the stationary disk 14.

The peripheral wall 122 has the inlet 12a at a location that is closer to the opening 120a than to the bottom wall 121. The peripheral wall 122 also has the first outlet 12b and the second outlet 12c at a location that is closer to the bottom wall 121 than to the opening 120a. Each of the inlet 12a, the first outlet 12b and the second outlet 12c is a tubular member that has a flow passage therein.

A mounting portion 122a, on which the stationary disk 14 is placed, is formed at the inside of the peripheral wall 122 at a location between the portion of the peripheral wall 122, at which the inlet 12a is formed, and the portion of the peripheral wall 122, at which the outlets 12b, 12c are formed. The mounting portion 122a is a portion that contacts a back surface of the stationary disk 14 which is opposite to an opening surface 140 of the stationary disk 14. The mounting portion 122a is formed at the portion of the peripheral wall 122 where an inner diameter of the peripheral wall 122 changes. Specifically, the mounting portion 122a is a flat portion that extends in the radial direction DRr. A receiving groove 122b, which receives a gasket 15 described later, is formed at the mounting portion 122a.

Furthermore, the peripheral wall 122 has a first disk opposing portion 122c, which is opposed to the stationary disk 14 in the radial direction DRr, and a second disk opposing portion 122d, which is opposed to the drive disk 22 in the radial direction DRr. In the present embodiment, the second disk opposing portion 122d serves as a disk opposing wall that is opposed to the drive disk 22 in a direction which is perpendicular to the axial direction DRa.

Figure 4:
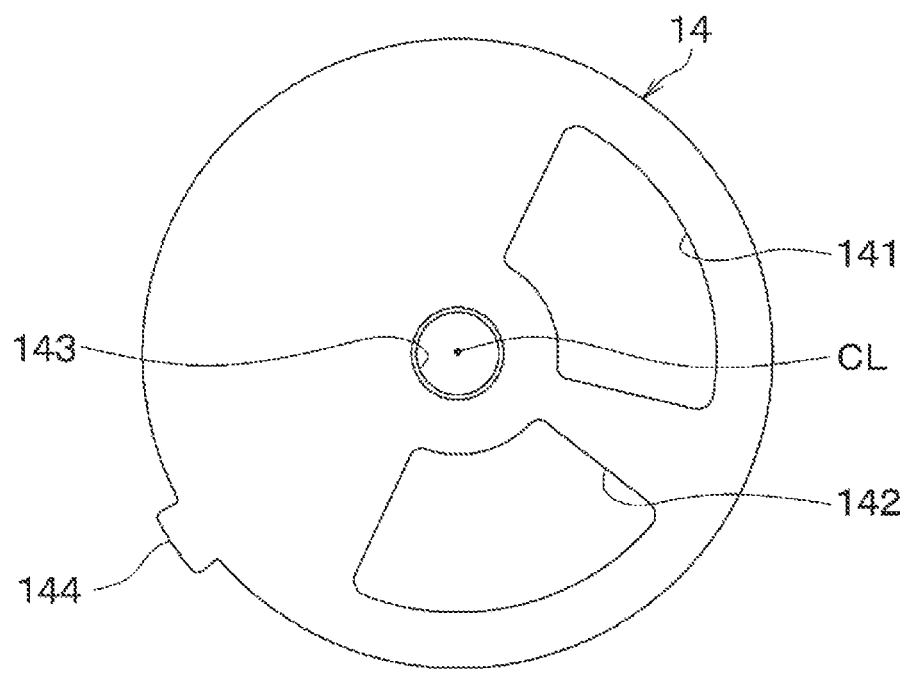
FIG. 4 is a bottom view of a stationary disk.

The first disk opposing portion 122c has a receiving groove (not shown) that receives a rotation stop projection 144 of the stationary disk 14 shown in FIG. 4. The rotation of the stationary disk 14 may be stopped by, for example, a rotation stop pin instead of the rotation stop projection 144.

An inner diameter Dh of the first disk opposing portion 122c is larger than an outer diameter Dd of a remaining portion of the stationary disk 14, which is other than the rotation stop projection 144. Thereby, a gap is formed between the stationary disk 14 and the peripheral wall 122 in a state where the stationary disk 14 is placed on the mounting portion 122a. In other words, the stationary disk 14 is not positioned by the peripheral wall 122.

An inner diameter of the second disk opposing portion 122d is larger than the inner diameter of the first disk opposing portion 122c. The inner diameter of the second disk opposing portion 122d is larger than an outer diameter of the drive disk 22. Thereby, a gap is formed between the drive disk 22 and the peripheral wall 122. That is, the drive disk 22 does not contact the peripheral wall 122 and is not positioned by the peripheral wall 122. The outer diameter of the drive disk 22 is substantially the same as an outer diameter Dd of the stationary disk 14.

The inside of the housing 12 is partitioned by the stationary disk 14 into an inlet-side space 12d and an outlet-side space 12e. The inlet-side space 12d is a space that is communicated with the inlet 12a at the inside of the housing 12. The outlet-side space 12e is a space that is communicated with the first outlet 12b and the second outlet 12c at the inside of the housing 12.

Although not shown in the drawing, a partition portion, which is shaped in a plate form, is formed at the inside of the main body 120. The partition portion partitions the outlet-side space 12e into a first outlet-side space, which is communicated with the first passage hole 141, and a second outlet-side space, which is communicated with the second passage hole 142. This partition portion is formed to extend across the outlet-side space 12e in the radial direction DRr.

The main-body cover 124 is a lid member that covers the opening 120a of the main body 120. The main-body cover 124 has a plate portion 124a, a rib portion 124b, a boss portion 124c and a spring guide 125. The plate portion 124a, the rib portion 124b, the boss portion 124c and the spring guide 125 are formed integrally in one-piece as an integral molded product.

The plate portion 124a is a portion that is shaped in a circular ring form which extends in the radial direction DRr. In the main-body cover 124, the plate portion 124a forms the inlet-side space 12d in corporation with the peripheral wall 122 and the stationary disk 14.

The rib portion 124b is a portion of the main-body cover 124 that is fitted into the opening 120a of the main body 120. The rib portion 124b is shaped in a tubular form and is placed on a radially outer side of the plate portion 124a. The rib portion 124b is formed to project from the plate portion 124a toward the bottom wall 121. An O-ring 124d, which seals a gap between the main body 120 and the main-body cover 124, is placed between the rib portion 124b and the peripheral wall 122.

The boss portion 124c is a portion through which the shaft 18 is inserted. The boss portion 124c is shaped in a tubular form and is placed on a radially inner side of the plate portion 124a. The boss portion 124c projects from the plate portion 124a toward the one side in the axial direction DRa. The boss portion 124c is provided with: a shaft seal 124e, which is placed at the inside of the boss portion 124c; and an O-ring 124f, which is placed at the outside of the boss portion 124c and seals a gap between the boss portion 124c and the drive device 16. Furthermore, a bearing 124g, which rotatably supports the shaft 18, is placed at the inside of the boss portion 124c.

The spring guide 125 is a guide member that limits the first torsion spring 28 in a proper position, so that the first torsion spring 28 properly functions. The spring guide 125 is placed at the inside of the first torsion spring 28 and is circumferentially arranged around the central axis CL.

The stationary disk 14 is made of a circular disk member. The stationary disk 14 is placed at the inside of the housing 12 and is oriented such that a thickness direction of the stationary disk 14 coincides with the axial direction DRa. The stationary disk 14 has the opening surface 140 that is a front surface of the stationary disk 14 along which the drive disk 22 slides. The opening surface 140 is a contact surface that contacts a sliding surface 220 of the drive disk 22 which will be described later.

It is desirable that the stationary disk 14 is made of a material that has a smaller linear expansion coefficient and has superior wear resistance than the material of the housing 12. The material of the stationary disk 14 is a high-hardness material that is harder than the material of the housing 12. Specifically, the stationary disk 14 is made of ceramic. The stationary disk 14 is a powder molded product that is formed by molding ceramic powder into a desired shape with a press machine. Alternatively, the stationary disk 14 may be formed such that only a portion of the stationary disk 14, which forms the opening surface 140, is made of the material, such as the ceramic, which has the smaller linear expansion coefficient and the superior wear resistance than the material of the housing 12.

In addition, the stationary disk 14 serves as a flow passage forming portion that has the passage holes 141, 142 through each of which the fluid is conducted. Therefore, in the valve device 10 of the present embodiment, the stationary disk 14, which serves as the flow passage forming portion, is formed as a separate member that is formed separately from the housing 12.

As shown in FIG. 4, the stationary disk 14 has the first passage hole 141 and the second passage hole 142 through each of which the fluid passes. The first passage hole 141 and the second passage hole 142 are formed in the stationary disk 14 at a location, which is spaced from the central axis CL of the shaft 18, such that the first passage hole 141 and the second passage hole 142 do not overlap with the central axis CL of the shaft 18. Each of the first passage hole 141 and the second passage hole 142 is a through-hole that is shaped in a sector shape (i.e., fan shape), and each of the first passage hole 141 and the second passage hole 142 functions as a communication passage that communicates between the inlet-side space 12d and the outlet-side space 12e. Here, it should be noted that the first passage hole 141 and the second passage hole 142 may be formed in any other shape such as a circular shape or an elliptical shape.

Specifically, the first passage hole 141 is formed at a portion of the stationary disk 14, which corresponds to the first outlet-side space, such that the first passage hole 141 is communicated with the first outlet-side space. Furthermore, the second passage hole 142 is formed at a portion of the stationary disk 14, which corresponds to the second outlet-side space, such that the second passage hole 142 is communicated with the second outlet-side space.

A stationary-side insertion hole 143 is formed at generally a center part of the stationary disk 14. The stationary-side insertion hole 143 is a through-hole, through which the shaft 18 is inserted. The stationary-side insertion hole 143 will be described later in detail.

The gasket 15, which seals a gap between the stationary disk 14 and the mounting portion 122a, is placed between the stationary disk 14 and the mounting portion 122a. The gasket 15 is made of rubber. The gasket 15 is received in the receiving groove 122b formed at the mounting portion 122a. The gasket 15 has at least two projections at a seal surface thereof opposed to the stationary disk 14 and at least two projections at another seal surface thereof opposed to the mounting portion 122a. Specifically, the gasket 15 has two projections that project in the axial direction DRa at each of the seal surfaces thereof. This type of gasket 15 can be obtained by, for example, a simple technique such as forming a recess in a flat seal surface.

Figure 5:
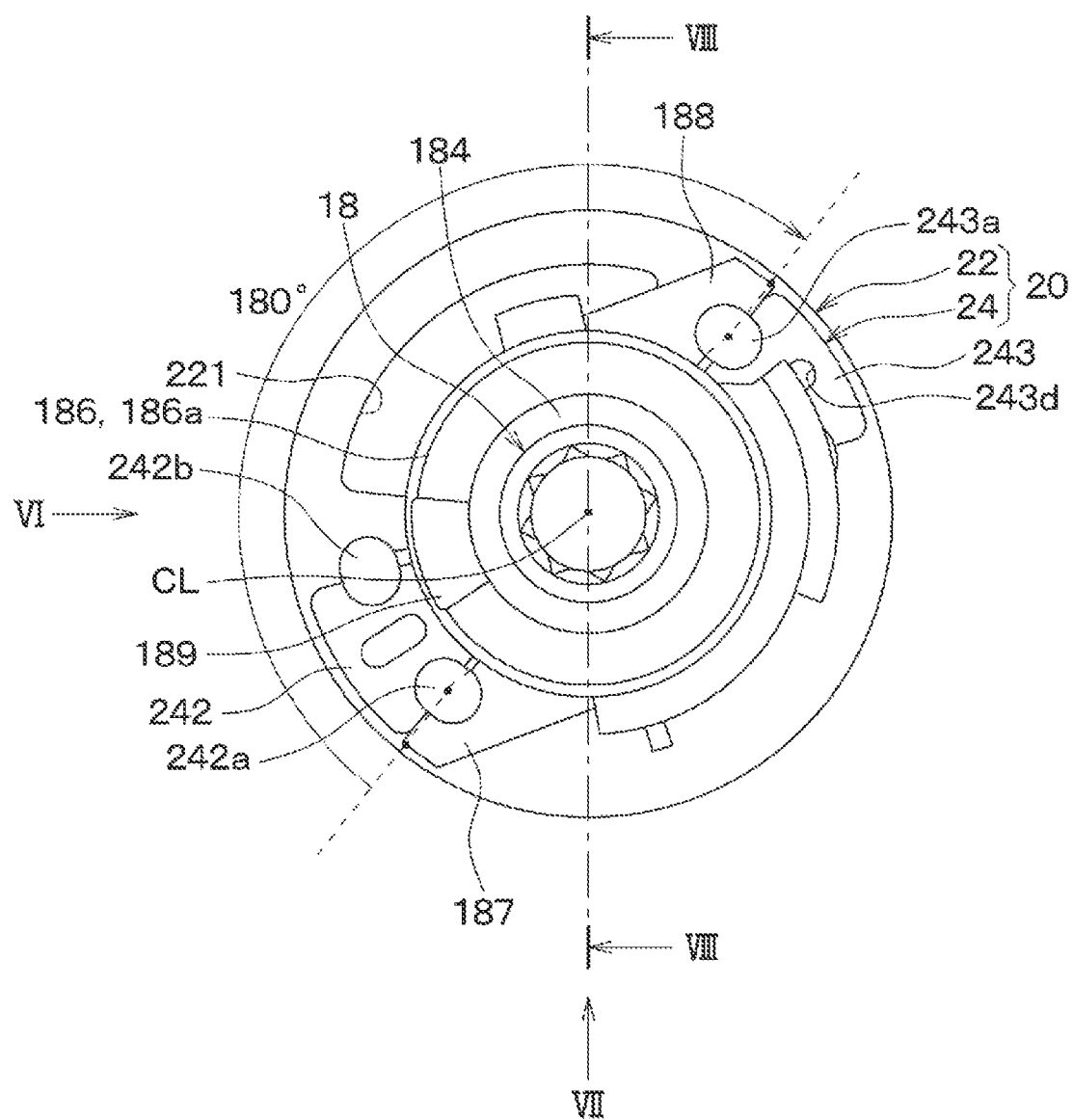
FIG. 5 is a plan view of an assembly of a shaft, a rotor and a lever.

As shown in FIGS. 3 and 5, the shaft 18 is a rotatable shaft that is rotated about the central axis CL, which is predetermined, by the rotational force outputted from the drive device 16. The shaft 18 extends in the axial direction DRa. Two axial sides of the shaft 18, which are opposite to each other in the axial direction DRa, are rotatably supported by the housing 12. That is, the shaft 18 has a double end support structure. The shaft 18 extends through the stationary disk 14 and the drive disk 22 and is rotatably supported relative to the housing 12. Specifically, the one axial side of the shaft 18, which faces the one side in the axial direction DRa, is rotatably supported by the bearing 124g that is placed at the inside of the main-body cover 124. Furthermore, the other axial side of the shaft 18, which faces the other side in the axial direction DRa, is supported by a bearing hole 121c formed at the bottom wall 121 of the main body 120. The bearing hole 121c is formed by a plain bearing. It should be noted that the bearing hole 121c may be formed by a ball bearing or the like instead of the plain bearing.

As shown in FIGS. 3, 6, 7 and 8, the shaft 18 includes a shaft core 181 and a holder 182. The shaft core 181 is made of metal, and the holder 182 is made of resin and is coupled to the shaft core 181. The shaft core 181 and the holder 182 are coupled together to integrally rotate.

The shaft core 181 includes the central axis CL of the shaft 18 and extends in the axial direction DRa. The shaft core 181 is a portion that serves as a rotational center of the rotor 20. The shaft core 181 is formed by a rod member made of metal to ensure straightness of the shaft core 181.

The holder 182 is coupled to the one axial side of the shaft core 181 which faces the one side in the axial direction DRa. The holder 182 is shaped in a bottomed tubular form. The shaft core 181 is coupled to an inside of a distal end portion of the holder 182 which is located on the one side in the axial direction DRa. In other words, the one end portion of the shaft core 181, which faces the one side in the axial direction DRa, is placed at the inside of the distal end portion of the holder 182. The distal end portion of the holder 182, which projects to the outside of the housing 12, is coupled to a gear arrangement 162 of the drive device 16.

An inner diameter of the holder 182 increases stepwise from the one side toward the other side in the axial direction DRa. Specifically, the holder 182 includes: a shaft coupling portion 183 which is located on the one axial side in the axial direction DRa; an intermediate portion 184 which is connected to the shaft coupling portion 183; a small diameter portion 185 which is connected to the intermediate portion 184; and a large diameter portion 186 which is connected to the small diameter portion 185. The inner diameter of the holder 182 is increased in an order of the shaft coupling portion 183, the intermediate portion 184, the small diameter portion 185 and the large diameter portion 186.

The shaft coupling portion 183 is the distal end portion of the holder 182 which is located on the one axial side in the axial direction DRa. The shaft core 181 is coupled to the shaft coupling portion 183. An outer part of the shaft coupling portion 183, which projects to the outside of the boss portion 124c, has a shaft gear 183a that is meshed with a part of the gear arrangement 162. An outer periphery of the shaft coupling portion 183, which is located at the inside of the boss portion 124c, is supported by the bearing 124g.

The intermediate portion 184 is a portion which is placed at the inside of the boss portion 124c. The intermediate portion 184 has an inner diameter slightly larger than the outer diameter of the shaft core 181. The shaft seal 124e, which is a seal member, is placed at the outside of the intermediate portion 184.

The small diameter portion 185 forms a space in which the compression spring 26 described later is placed. The small diameter portion 185 has the inner diameter which is slightly larger than the inner diameter of the intermediate portion 184. A connecting end surface 185a, which connects between the intermediate portion 184 and the small diameter portion 185, is a contact portion to which one end portion of the compression spring 26 contacts. The large diameter portion 186 is connected to an outside of the small diameter portion 185.

The large diameter portion 186 is located on the outer side of the small diameter portion 185 in the radial direction DRr. The large diameter portion 186 has an inner diameter that is slightly larger than an inner diameter of the small diameter portion 185. The large diameter portion 186 has: a body portion 186a shaped in a tubular form, a first large diameter anchoring portion 186b, a second large diameter anchoring portion 186c; a first flange portion 187; and a second flange portion 188.

Figure 7:
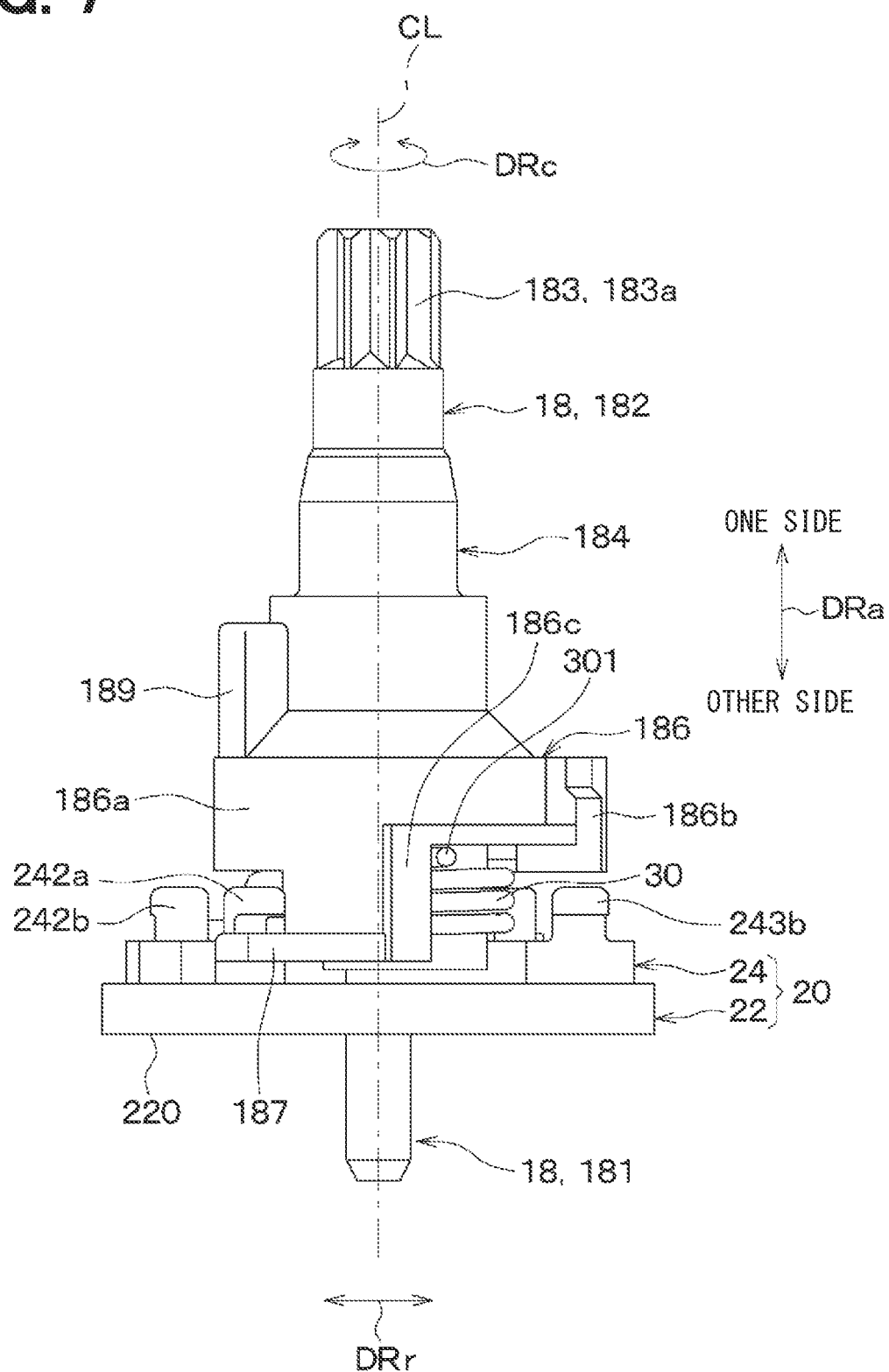
FIG. 7 is a perspective view of the assembly of the shaft, the rotor and the lever viewed in a direction of an arrow VII in FIG. 5.

The first large diameter anchoring portion 186b is a hook anchoring portion to which a hook 282 of the first torsion spring 28 is anchored. As shown in FIG. 7, the first large diameter anchoring portion 186b is formed at an outside of the body portion 186a at one axial side of the body portion 186a, which is located on the one side in the axial direction DRa. The first large diameter anchoring portion 186b outwardly projects from the body portion 186a in the radial direction DRr such that the first large diameter anchoring portion 186b is opposed to the hook 282 of the first torsion spring 28 in the circumferential direction DRc.

The second large diameter anchoring portion 186c is a hook anchoring portion to which a hook 301 of the second torsion spring 30 is anchored. As shown in FIG. 7, the second large diameter anchoring portion 186c is formed at the outside of the body portion 186a on the other side of the first large diameter anchoring portion 186b in the axial direction DRa. The second large diameter anchoring portion 186c outwardly projects from the body portion 186a in the radial direction DRr such that the second large diameter anchoring portion 186c is opposed to the hook 301 of the second torsion spring 30 in the circumferential direction DRc.

Each of the first flange portion 187 and the second flange portion 188 is an anchoring piece through which the shaft 18 engages with a corresponding engaging portion of a lever 24 described later. Each of the first flange portion 187 and the second flange portion 188 is formed at the outside of the body portion 186a on the other side of the second large diameter anchoring portion 186c in the axial direction DRa.

As shown in FIG. 5, the first flange portion 187 and the second flange portion 188 are shaped to be generally point-symmetric to each other with respect to the central axis CL of the shaft 18. Each of the first flange portion 187 and the second flange portion 188 outwardly projects from the body portion 186a in the radial direction DRr such that each of the first flange portion 187 and the second flange portion 188 is opposed to the corresponding engaging portion of the lever 24 in the circumferential direction DRc.

The holder 182, which is formed in the above-described manner, receives the urging force of the first torsion spring 28 and the urging force of the second torsion spring 30 by having the first large diameter anchoring portion 186b and the second large diameter anchoring portion 186c. Since the holder 182 has the first flange portion 187 and the second flange portion 188, the shaft 18 contacts the lever 24 at the different locations which are displaced from each other in the circumferential direction DRc. That is, the shaft 18 has the plurality of contact portions that are configured to contact the lever 24 and are respectively located at the plurality of locations which are displaced from each other in the circumferential direction DRc.

Furthermore, the holder 182 has the rotation limiter 189 which limits the rotational drive range of the shaft 18 in the circumferential direction DRc. The rotation limiter 189 is formed at a lower side of the intermediate portion 184 of the holder 182. The rotation limiter 189 is a projection that projects in the radial direction DRr. When the rotation limiter 189 contacts one of two stoppers of the housing 12, a rotational drive range of the shaft 18 in the circumferential direction DRc is limited.

Figure 9:
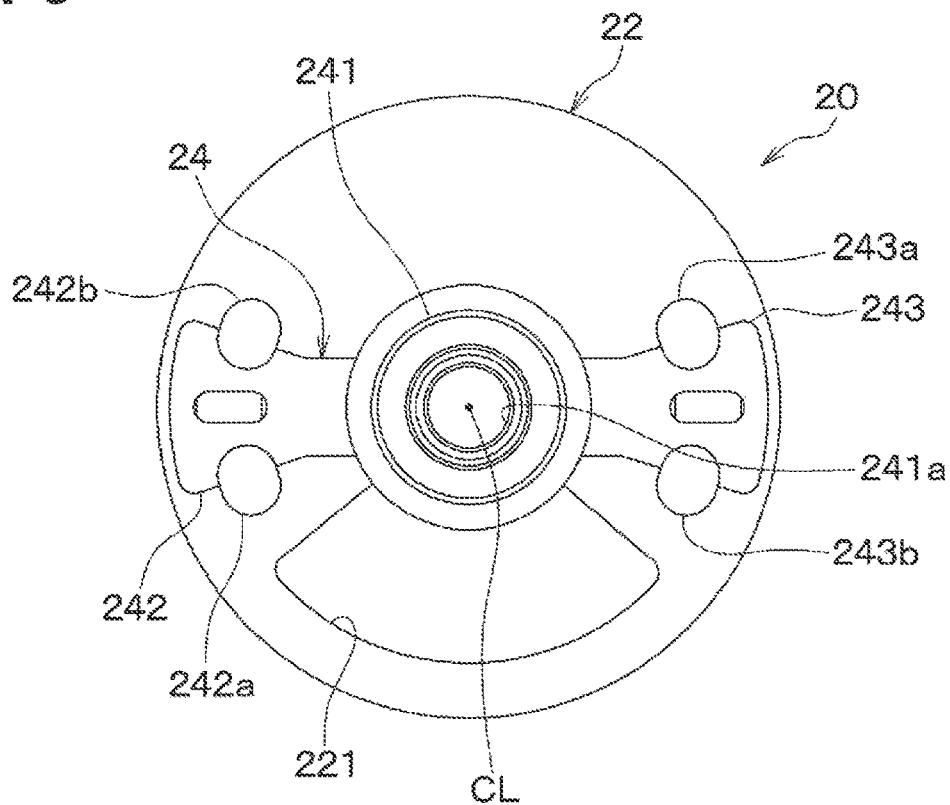
FIG. 9 is a plan view of the rotor.

The rotor 20 is rotated about the central axis CL of the shaft 18 by the output of the drive device 16. The rotor 20 increases or decreases the opening degree of each of the passage holes 141, 142 of the stationary disk 14 in response to the rotation of the shaft 18. As shown in FIG. 9, the rotor 20 includes: the drive disk 22, which serves as a valve element; and the lever 24, which couples the drive disk 22 to the shaft 18.

Figure 10:
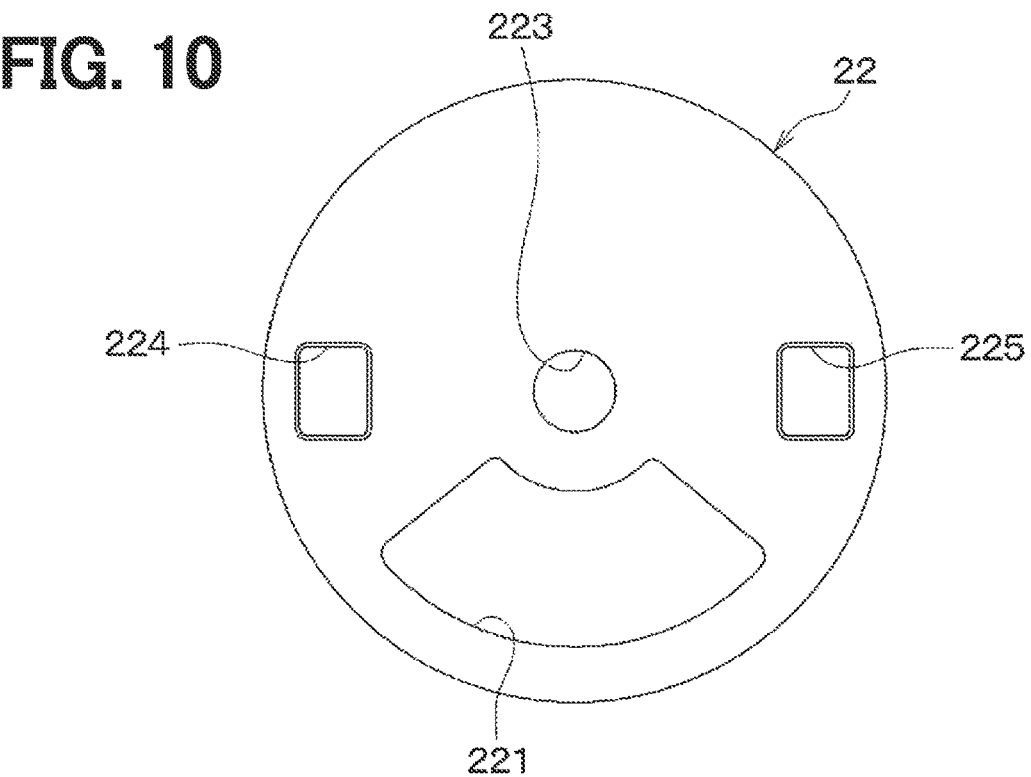
FIG. 10 is a plan view of a drive disk.
Figure 11:
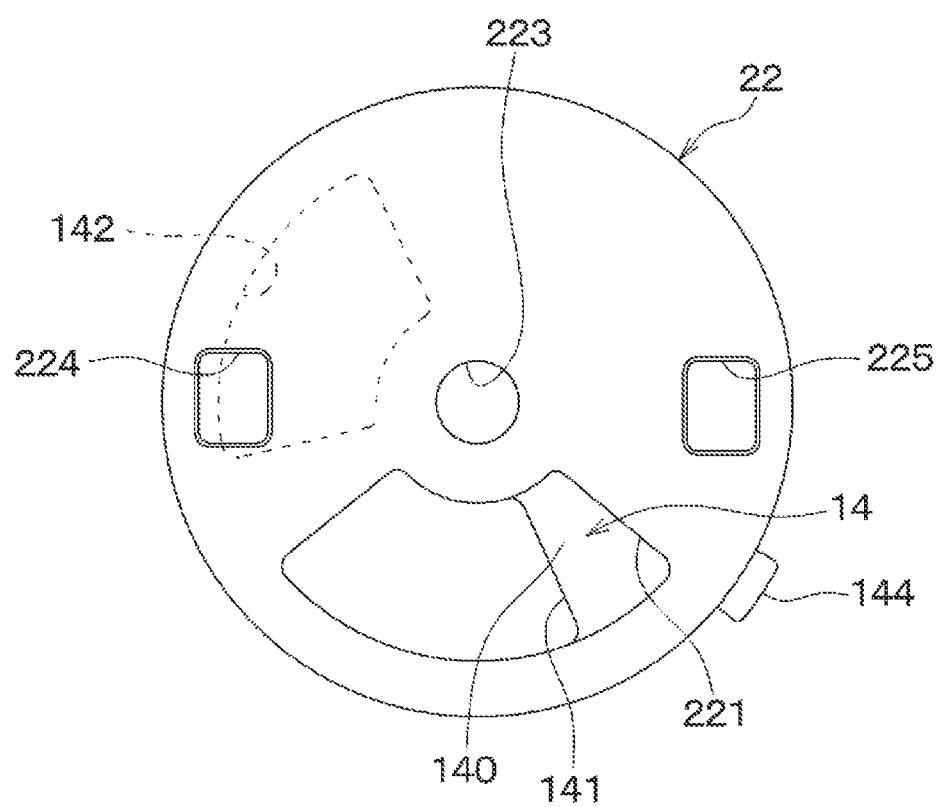
FIG. 11 is a plan view showing a state where the drive disk is placed on the stationary disk.

The drive disk 22 shown in FIGS. 9, 10 and 11 is the valve element that increases or decreases the opening degree of the first passage hole 141 and the opening degree of the second passage hole 142 in response to the rotation of the shaft 18. The opening degree of the first passage hole 141 is a degree of opening of the first passage hole 141. Here, the opening degree of the first passage hole 141 in a full-opening state of the first passage hole 141 is indicated as 100%, and the opening degree of the first passage hole 141 in a full-closing state of the first passage hole 141 is indicated as 0%. The full opening state of the first passage hole 141 is, for example, a state where the first passage hole 141 is not closed by the drive disk 22 at all. The full closing state of the first passage hole 141 is, for example, a state where the first passage hole 141 is entirely closed by the drive disk 22. The opening degree of the second passage hole 142 is the same as the opening degree of the first passage hole 141.

The drive disk 22 is made of a circular disk member. The drive disk 22 is placed at the inside of the housing 12 and is oriented such that a thickness direction of the drive disk 22 coincides with the axial direction DRa. The drive disk 22 is placed in the inlet-side space 12d such that the drive disk 22 is opposed to the stationary disk 14 in the axial direction DRa. The drive disk 22 has the sliding surface 220 that is opposed to the opening surface 140 of the stationary disk 14. The sliding surface 220 is a seal surface that seals the opening surface 140 of the stationary disk 14.

Figure 8:
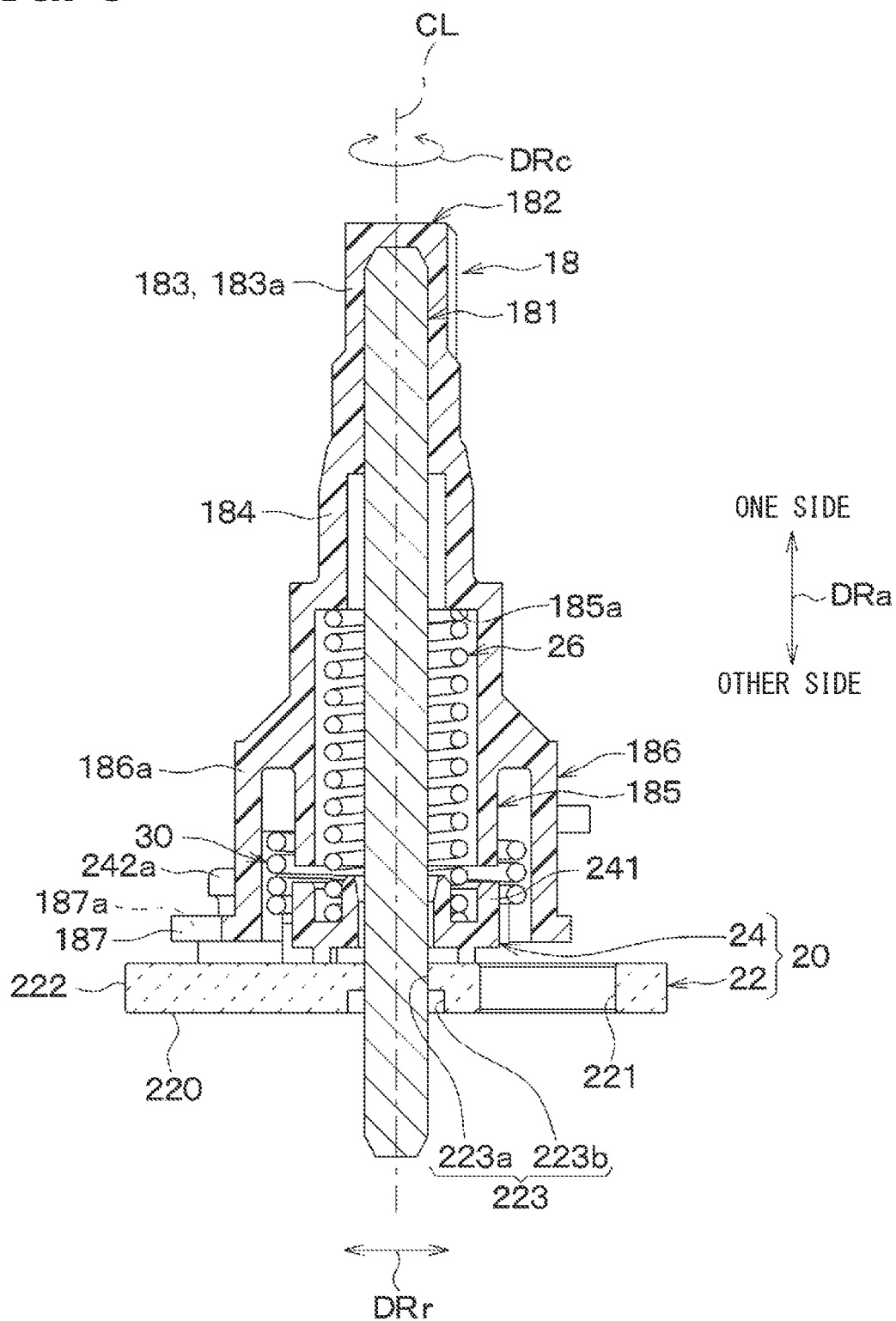
FIG. 8 is a cross-sectional view taken along line VIII-VIII in FIG. 5.

As shown in FIG. 8, the drive disk 22 has a disk peripheral wall 222 that is opposed to the second disk opposing portion 122d of the housing 12. The disk peripheral wall 222 extends in the axial direction DRa.

Preferably, the drive disk 22 is made of a material that has a smaller coefficient of linear expansion and superior wear resistance in comparison to the material of the housing 12. The material of the drive disk 22 is a high-hardness material that is harder than the material of the housing 12. Specifically, the drive disk 22 is made of ceramic. The drive disk 22 is a powder molded product that is formed by molding ceramic powder into a desired shape with a press machine. Alternatively, the drive disk 22 may be formed such that only a portion of the drive disk 22, which forms the sliding surface 220, is made of the material, such as the ceramic, which has the smaller linear expansion coefficient and the superior wear resistance than the material of the housing 12.

The ceramic is a material that has: a small linear expansion coefficient; a small dimensional change upon absorption of water; and excellent wear resistance. When the drive disk 22 is made of the ceramic, a relative positional relationship between the drive disk 22 and the shaft 18 and a relative positional relationship between the drive disk 22 and the housing 12 are stabilized. As a result, it is possible to ensure the accuracy of the flow rate control of the fluid and limit unintended leakage of the fluid.

A rotor hole 221 is formed at the drive disk 22 at a location that is displaced from the central axis CL of the shaft 18. The rotor hole 221 is a through-hole that extends through the drive disk 22 in the axial direction DRa. The rotor hole 221 is formed at a portion of the drive disk 22 where the rotor hole 221 can overlap with the first passage hole 141 and the second passage hole 142 in the axial direction DRa when the drive disk 22 is rotated about the central axis CL of the shaft 18.

The drive disk 22 has a drive-side insertion hole 223 at a substantially center part of the drive disk 22. The drive-side insertion hole 223 is a through-hole, through which the shaft 18 is inserted. The drive-side insertion hole 223 will be described later in detail. The drive disk 22 has a first press-fitting groove 224 and a second press-fitting groove 225, into which portions of the lever 24 are press-fitted.

In the valve device 10, when the drive disk 22 is rotated to a position where the rotor hole 221 overlaps with the first passage hole 141 in the axial direction DRa, the first passage hole 141 is opened. Furthermore, in the valve device 10, when the drive disk 22 is rotated to a position where the rotor hole 221 overlaps with the second passage hole 142 in the axial direction DRa, the second passage hole 142 is opened.

The drive disk 22 is configured to adjust a flow rate ratio between a flow rate of the fluid, which passes through the first passage hole 141, and a flow rate of the fluid, which passes through the second passage hole 142. That is, the drive disk 22 is configured to decrease the opening degree of the second passage hole 142 in response to an increase in the opening degree of the first passage hole 141.

The lever 24 is a coupling member that couples the drive disk 22 to the shaft 18. The lever 24 is fixed to the drive disk 22 and couples between the drive disk 22 and the shaft 18 to enable integral rotation of the drive disk 22 and the shaft 18 in a state where the drive disk 22 is displaceable in the axial direction DRa of the shaft 18.

Specifically, as shown in FIG. 9, the lever 24 includes a circular disk portion 241, a first arm portion 242 and a second arm portion 243. The circular disk portion 241, the first arm portion 242 and the second arm portion 243 are formed integrally in one-piece as an integral molded product.

An intermediate insertion hole 241a, through which the shaft 18 is inserted, is formed generally at a center of the circular disk portion 241. The circular disk portion 241 is sized such that the circular disk portion 241 does not overlap with the drive-side insertion hole 223 in the axial direction DRa. The first arm portion 242 and the second arm portion 243 are joined to the circular disk portion 241.

Each of the first arm portion 242 and the second arm portion 243 outwardly projects from the circular disk portion 241 in the radial direction DRr. The first arm portion 242 and the second arm portion 243 project in opposite directions, respectively.

Specifically, the first arm portion 242 has a first engaging claw 242a and a second engaging claw 242b which project in the axial direction DRa from a side of the first arm portion 242 that is opposite to an opposing surface of the first arm portion 242 opposed to the drive disk 22. The first engaging claw 242a is configured to engage with the first flange portion 187 of the shaft 18. The second engaging claw 242b is a hook anchoring portion to which a hook 302 of the second torsion spring 30 is anchored.

The second arm portion 243 has a third engaging claw 243a and a fourth engaging claw 243b which project in the axial direction DRa from a side of the second arm portion 243 that is opposite to an opposing surface of the second arm portion 243 opposed to the drive disk 22. The third engaging claw 243a and the fourth engaging claw 243b are configured substantially the same manner as that of the first engaging claw 242a and the second engaging claw 242b. The third engaging claw 243a is configured to engage with the second flange portion 188 of the shaft 18.

Although not shown in the drawing, the first engaging claw 242a and the third engaging claw 243a respectively engage the flange portions 187, 188 in a state where a gap is formed between the engaging claw 242a, 243a and the flange portion 187, 188 in the axial direction DRa. Thereby, the lever 24 and the drive disk 22 are coupled to the shaft 18 in a state where the lever and the drive disk 22 are displaceable in the axial direction DRa. Furthermore, the opposing surface of each of the first arm portion 242 and the second arm portion 243, which is opposed to the drive disk 22, has a projection. The projections project toward the drive disk 22 such that the projections can be press-fitted into the first press-fitting groove 224 and the second press-fitting groove 225, respectively.

The lever 24, which is configured in the above-described manner, is fixed to the drive disk 22 by press-fitting the projections into the press-fitting grooves 224, 225, respectively. In the lever 24 of the present embodiment, the first arm portion 242 and the second arm portion 243 have substantially the identical shape so as to be point-symmetric to each other with respect to the intermediate insertion hole 241a. As a result, even in a state where the lever 24 is rotated by 180° in the circumferential direction DRc, the lever 24 can be assembled to the shaft 18 and the drive disk 22.

As shown in FIGS. 3 and 8, the compression spring 26 is an urging member that urges the rotor 20 against the stationary disk 14. The compression spring 26 is resiliently deformed in the axial direction DRa of the shaft 18. The compression spring 26 is placed at the inside of the housing 12 in a state where the compression spring 26 is compressed in the axial direction DRa. The one end portion of the compression spring 26, which faces the one side in the axial direction DRa, contacts the shaft 18, and the other end portion of the compression spring 26, which faces the other side in the axial direction DRa, contacts the rotor 20. More specifically, the one end portion of the compression spring 26, which faces the one side in the axial direction DRa, contacts the connecting end surface 185a of the inside of the holder 182, and the other end portion of the compression spring 26, which faces the other side in the axial direction DRa, contacts the circular disk portion 241. The compression spring 26 is not fixed to at least one of the rotor 20 and the shaft 18, so that the compression spring 26 does not function as a torsion spring.

The compression spring 26 urges the rotor 20 against the stationary disk 14, so that a contact state, in which the opening surface 140 of the stationary disk 14 and the sliding surface 220 of the drive disk 22 contact with each other, is maintained. This contact state is a state in which the opening surface 140 of the stationary disk 14 and the sliding surface 220 of the drive disk 22 make a surface-to-surface contact with each other. That is, the valve device 10 can maintain a posture of the drive disk 22 such that the drive disk 22 is in contact with the stationary disk 14.

Specifically, the compression spring 26 is arranged to surround the central axis CL of the shaft 18. In other words, the shaft 18 is placed at the inside of the compression spring 26. With this configuration, a load of the compression spring 26 on the drive disk 22 is restrained from being locally increased in the circumferential direction DRc of the shaft 18, so that the contact state between the sliding surface 220 and the opening surface 140 can be easily maintained.

The first torsion spring 28 is a spring that urges the shaft 18 relative to the housing 12 in the circumferential direction DRc around the central axis CL of the shaft 18. The first torsion spring 28 is placed between the housing 12 and the shaft 18. Specifically, the first torsion spring 28 has two hooks 282 which are located at two opposite ends, respectively, of the first torsion spring 28 in the axial direction DRa and outwardly project in the radial direction DRr. For convenience of explanation, hereinafter, the hook, which is located on the one side in the axial direction DRa, will be referred to as a first hook, and the other hook, which is located on the other side in the axial direction DRa, will be referred to as a second hook 282. In the present embodiment, the first hook serves as an anchoring hook that is anchored relative to the housing 12.

Although not shown in the drawing, the first hook is anchored to a main body-side anchoring portion of the main-body cover 124. The main body-side anchoring portion is formed by a projection that is formed at the inside of the rib portion 124b.

Figure 12:
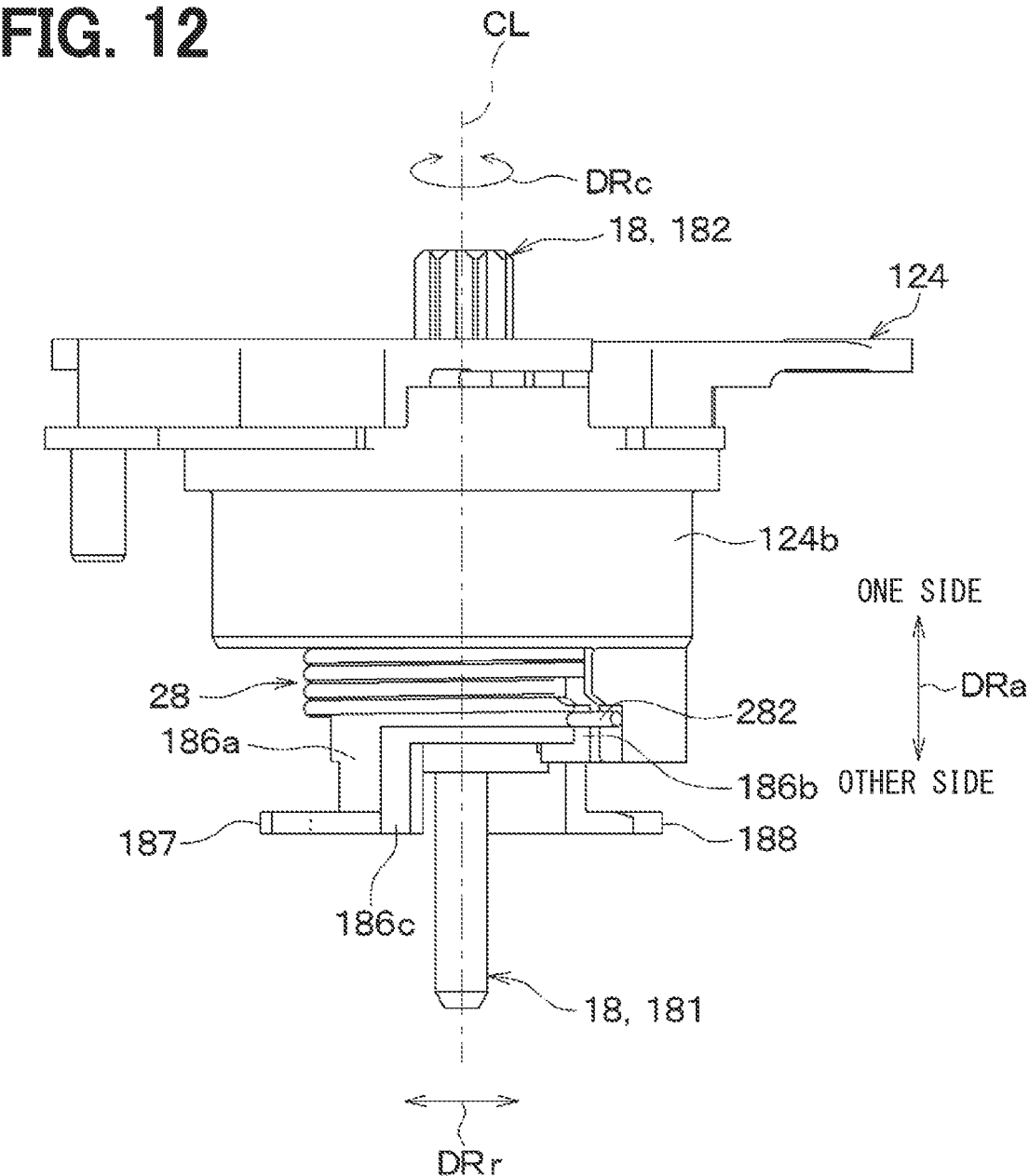
FIG. 12 is a side view of an assembly in which the shaft is assembled to a main-body cover.

As shown in FIG. 12, the second hook 282 is anchored to the first large diameter anchoring portion 186b of the holder 182. Since the second hook 282 is anchored to the first large diameter anchoring portion 186b, which is a rotatable member, a position of the second hook 282 changes in the circumferential direction DRc when the rotor 20 is rotated.

The first torsion spring 28 is basically used in a state where the first torsion spring 28 is twisted and resiliently deformed in the circumferential direction DRc. The urging force of the first torsion spring 28 is exerted to the shaft 18 at the time of rotating the shaft 18 and at the time of stopping the rotation of the shaft 18. The urging force of the first torsion spring 28 is transmitted as a rotational force from the gear arrangement 162 to an electric motor 161 of the drive device 16 through the shaft 18. Therefore, by placing the first torsion spring 28 between the housing 12 and the shaft 18, rattling in the circumferential direction DRc between the drive device 16 and the shaft 18 is limited. It should be noted that the first torsion spring 28 is only twisted in the circumferential direction DRc and is not compressed in the axial direction DRa.

The second torsion spring 30 is a spring that urges the lever 24 against the shaft 18 in the circumferential direction DRc. The second torsion spring 30 is placed between the shaft 18 and the lever 24. A dimension of the second torsion spring 30 in the axial direction DRa and a dimension of the second torsion spring 30 in the radial direction DRr are smaller than those of the first torsion spring 28.

The second torsion spring 30 has the two hooks 301, 302 which are located at two opposite ends, respectively, of the second torsion spring 30 in the axial direction DRa and outwardly project in the radial direction DRr. For convenience of explanation, hereinafter, the hook 301, which is located on the one side in the axial direction DRa, will be referred to as a third hook 301, and the hook 302, which is located on the other side in the axial direction DRa, will be referred to as a fourth hook 302.

Figure 6:
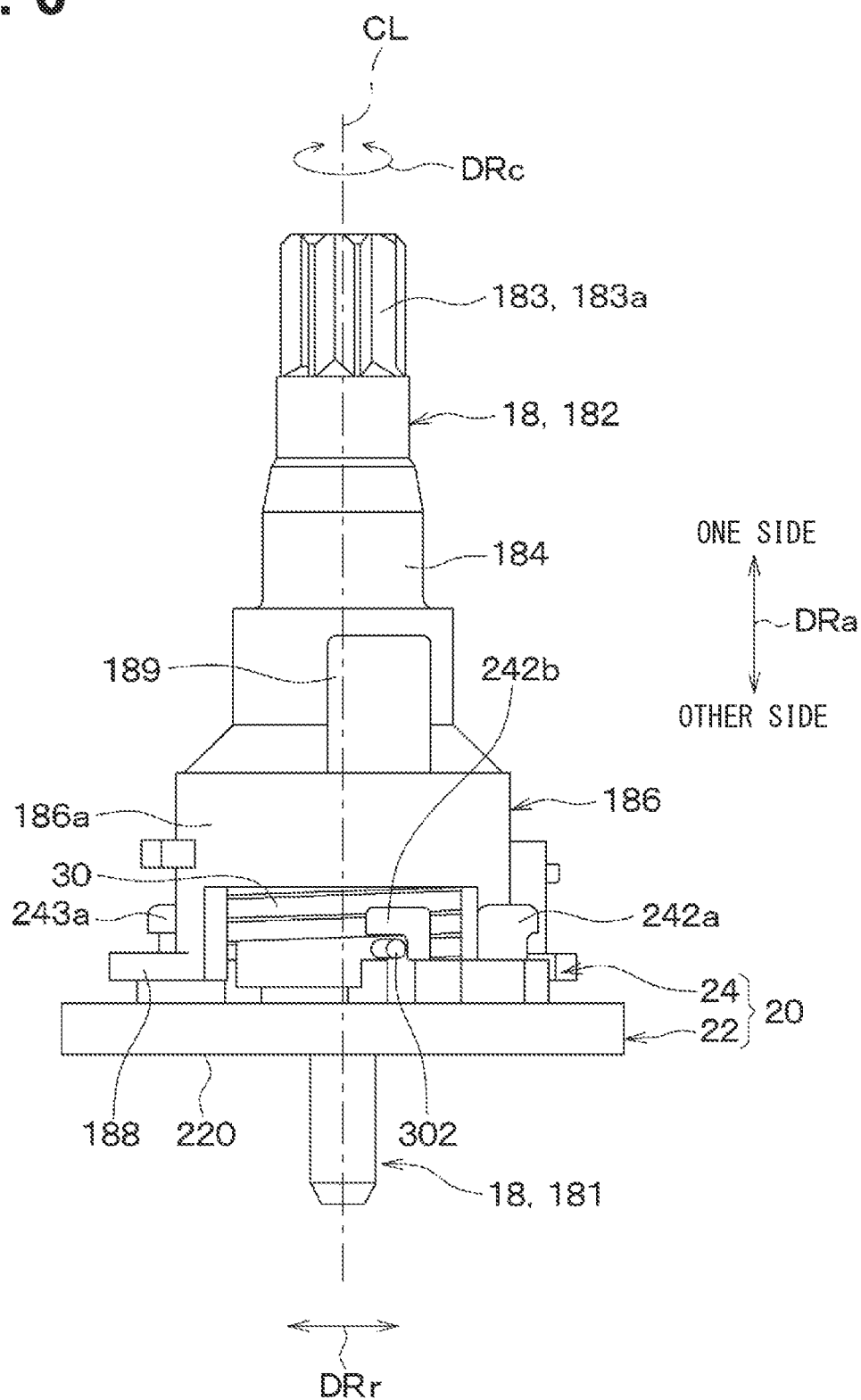
FIG. 6 is a perspective view of the assembly of the shaft, the rotor and the lever viewed in a direction of an arrow VI in FIG. 5.

As shown in FIG. 7, the third hook 301 of the second torsion spring 30 is anchored to the second large diameter anchoring portion 186c of the holder 182. Furthermore, as shown in FIG. 6, the fourth hook 302 is anchored to the second engaging claw 242b of the lever 24.

The second torsion spring 30 is basically used in a state where the second torsion spring 30 is twisted and resiliently deformed in the circumferential direction DRc. The urging force of the second torsion spring 30 is exerted to the lever 24 at the time of rotating the shaft 18 and at the time of stopping the rotation of the shaft 18. The urging force of the second torsion spring 30 is transmitted as a rotational force to the drive disk 22 through the lever 24. Therefore, by placing the second torsion spring 30 between the shaft 18 and the lever 24, rattling in the circumferential direction DRc between the shaft 18 and the lever 24 is limited. Since the lever 24 is fixed to the drive disk 22, the second torsion spring 30 limits rattling in the circumferential direction DRc in the transmission path that is from the shaft 18 to the drive disk 22. It should be noted that the second torsion spring 30 is only twisted in the circumferential direction DRc and is not compressed in the axial direction DRa.

In the valve device 10, by engaging each flange portion 187, 188 of the shaft 18 with the lever 24 in the state where the second torsion spring 30 is interposed between the shaft 18 and the lever 24, these three components are assembled together as a sub-assembly.

The drive device 16 is a device for outputting the rotational force. As shown in FIG. 3, the drive device 16 includes: the electric motor 161 which serves as a drive power source; and the gear arrangement 162 which serves as a drive force transmission member and transmits the output of the electric motor 161 to the shaft 18. The electric motor 161 is rotated according to a control signal outputted from the motor controller unit 163 that is electrically connected to the electric motor 161. The gear arrangement 162 is a speed reducer that is configured to reduce the rotational speed of the rotation outputted from the electric motor 161. The gear arrangement 162 is formed by a gear mechanism that includes an output gear. The output gear is a gear that is meshed with the shaft gear 183a.

In the valve device 10 of the present embodiment, the shaft 18 extends through the stationary disk 14 and the drive disk 22. The stationary-side insertion hole 143 of the stationary disk 14 and the drive-side insertion hole 223 of the drive disk 22 are loosely fitted to the shaft 18. That is, a diameter of the stationary-side insertion hole 143 and a diameter of the drive-side insertion hole 223 are larger than a shaft diameter. The shaft diameter is defined as an outer diameter of an inserted portion of the shaft 18, which is inserted through the drive-side insertion hole 223. In the present embodiment, the shaft core 181 of the shaft 18 is inserted through the drive-side insertion hole 223. Therefore, the shaft diameter coincides with an outer diameter of the shaft core 181 of the shaft 18.

Figure 13:
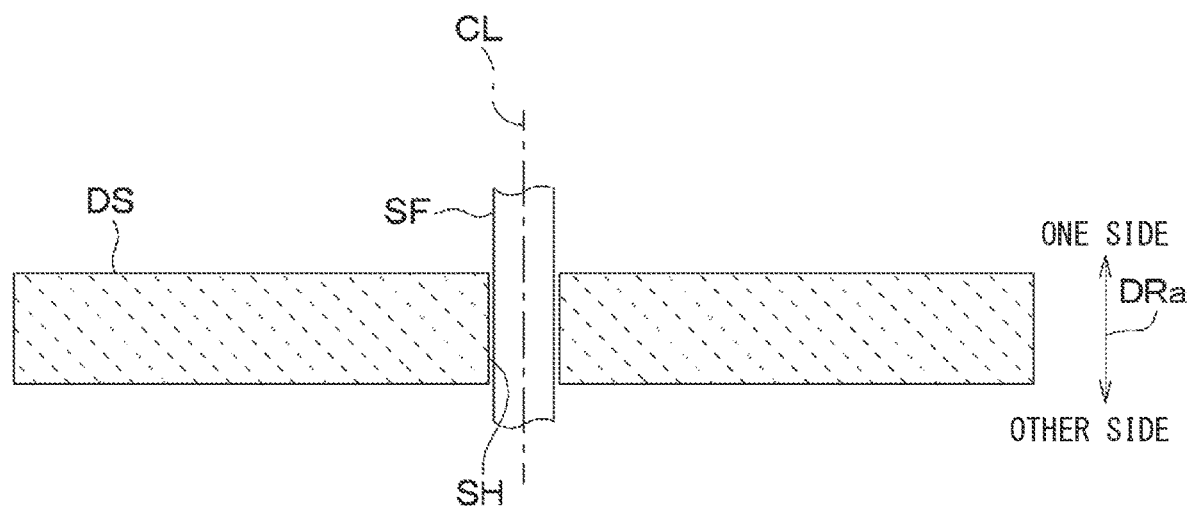
FIG. 13 is an explanatory diagram for explaining an insertion hole of a drive disk, through which a shaft is inserted, in a comparative example.

FIG. 13 indicates a relationship between a drive disk DS and a shaft SF of a comparative example of the present embodiment. As shown in FIG. 13, in the drive disk DS of the comparative example, a hole diameter of a drive-side insertion hole SH is larger than a shaft diameter of the shaft SF. The drive-side insertion hole SH extends in the axial direction DRa and is formed as a through-hole which has a constant hole diameter that is constant in the axial direction DRa.

As in the drive disk DS of the comparative example, when the hole diameter of the drive-side insertion hole SH is larger than the shaft diameter of the shaft SF, variations in the opening degree of each passage hole 141, 142 are likely to occur due to misalignment between the rotational center of the drive disk DS and the central axis CL of the shaft SF. The variations in the opening degree of each passage hole 141, 142 are not desirable since it will cause generation of variations in the flow rate of the fluid passing through the valve device 10.

Figure 14:
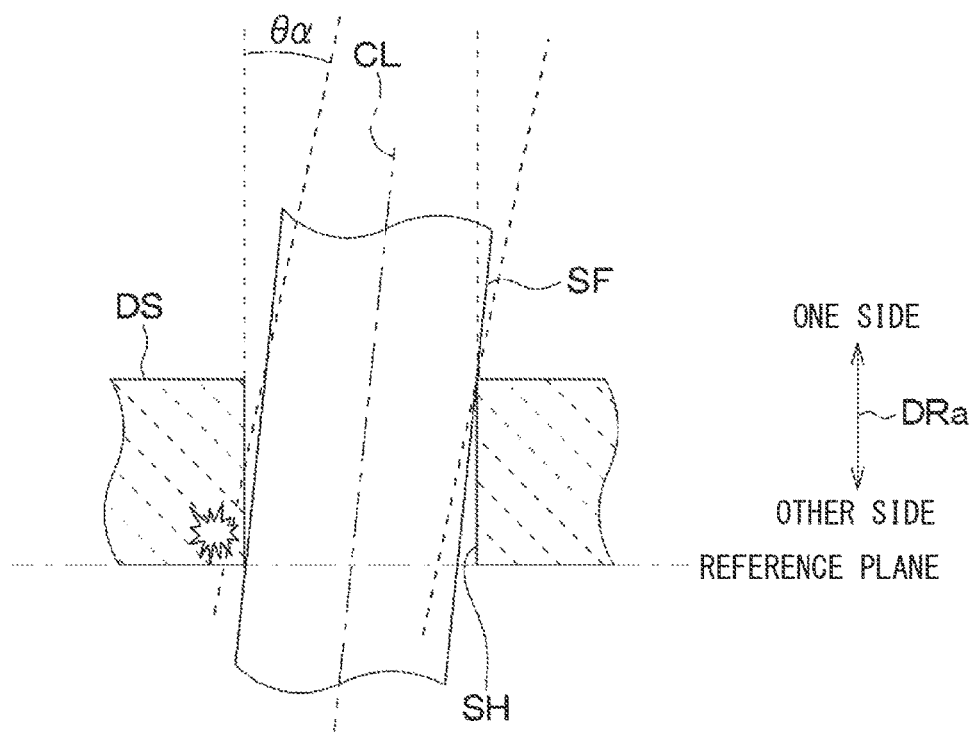
FIG. 14 is an explanatory diagram for explaining a tilted state of the shaft in the comparative example.

With respect to this point, it is conceivable to reduce the hole diameter of the drive-side insertion hole SH. However, as shown in FIG. 14, when the shaft SF is tilted from a designed target posture of the shaft SF to a posture indicated by a dotted line due to some reason, the drive disk DS is also tilted together with the shaft SF. In this case, a degree of close contact between the drive disk DS and the stationary disk 14 is deteriorated. Factors, which cause the tilting of the shaft 18, include, for example, variations in the dimension of the shaft 18 in the axial direction DRa, and a structure where two opposite end portions of the shaft 18 are supported by separate members, respectively. The tilted posture of the shaft SF, which is indicated by the dotted line in FIG. 14, is a posture where a line, which is perpendicular to a reference plane (i.e., a plane of the sliding surface of the drive disk DS), intersects the central axis CL by a predetermined angle θα.

Taking these factors into account, the drive disk 22 of the present embodiment is configured to enable an increase in a tilt range of the shaft 18 in a state where the drive disk 22 is in close contact with the stationary disk 14. That is, the drive disk 22 is configured such that a hole diameter of at least one of two end portions of the drive-side insertion hole 223, which are opposite to each other in the axial direction DRa, is larger than a smallest hole diameter of the drive-side insertion hole 223. The stationary disk 14 is configured such that a hole diameter of at least one of two end portions of the stationary-side insertion hole 143, which are opposite to each other in the axial direction DRa, is larger than a smallest hole diameter of the stationary-side insertion hole 143.

Figure 15:
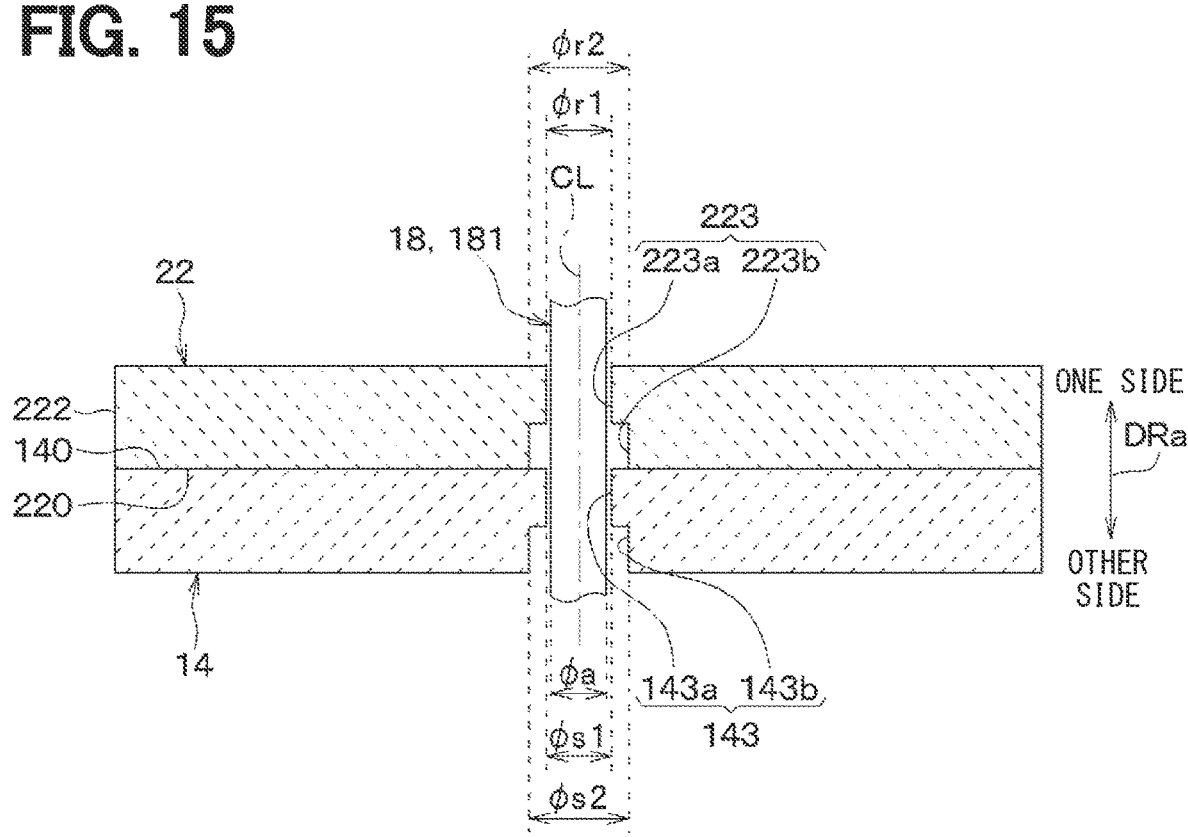
FIG. 15 is an explanatory diagram for explaining an insertion hole of each of the drive disk and the stationary disk, through which the shaft is inserted, in the valve device of the first embodiment.

As shown in FIG. 15, an inner wall of each of the drive-side insertion hole 223 and the stationary-side insertion hole 143 is shaped in a stepped form. In other words, the drive-side insertion hole 223 and the stationary-side insertion hole 143 are formed such that the hole diameter of each of the drive-side insertion hole 223 and the stationary-side insertion hole 143 is increased or decreased in a stepwise manner in the axial direction DRa.

Specifically, the drive-side insertion hole 223 has a first small diameter portion 223a and a first large diameter portion 223b which extend in the axial direction DRa. The first small diameter portion 223a is a portion of the drive-side insertion hole 223 located on the one side in the axial direction DRa. A hole diameter ϕr1 of the first small diameter portion 223a is slightly larger than the shaft diameter ϕa. Furthermore, the first large diameter portion 223b is another portion of the drive-side insertion hole 223 located on the other side in the axial direction DRa. A hole diameter ϕr2 of the first large diameter portion 223b is larger than the hole diameter ϕr1 of the first small diameter portion 223a. A length of the first small diameter portion 223a and a length of the first large diameter portion 223b measured in the axial direction DRa are substantially equal to each other. Here, it should be noted that the length of the first small diameter portion 223a and the length of the first large diameter portion 223b measured in the axial direction DRa may be different from each other.

Figure 16:
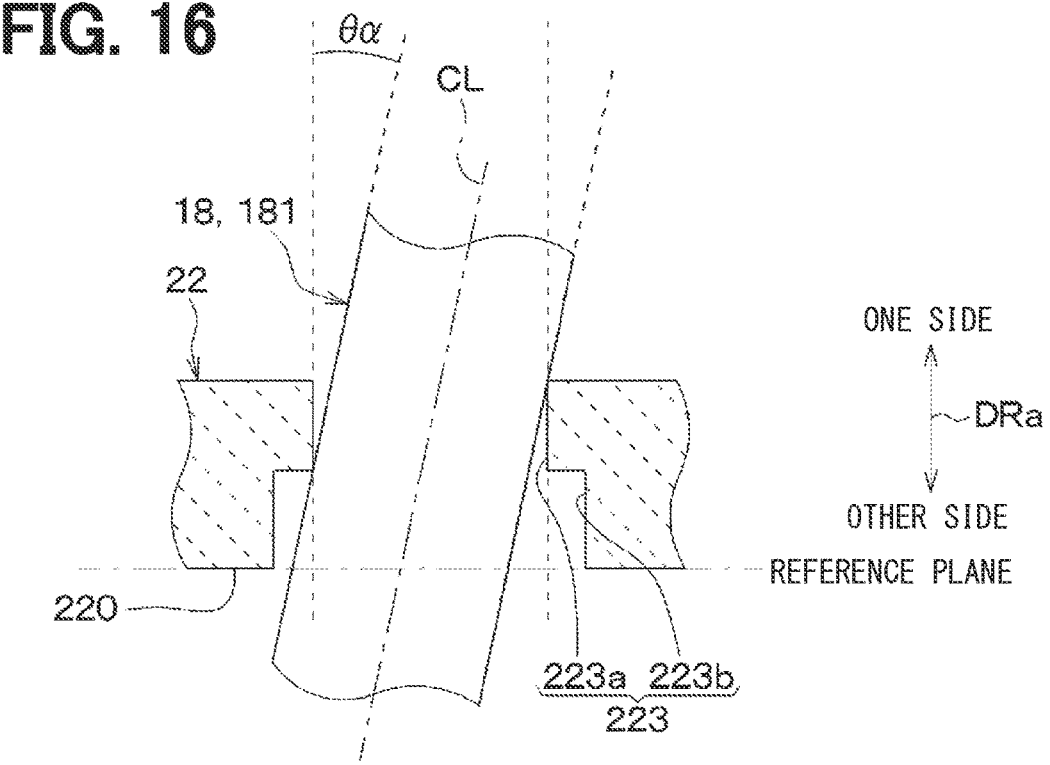
FIG. 16 is an explanatory diagram for explaining a tilted state of the shaft in the valve device of the first embodiment.

With this configuration, as shown in FIG. 16, even when the shaft 18 is tilted from a designed target posture of the shaft 18 to a posture indicated by a dotted line due to some reason, tilting of the drive disk 22 is limited. Therefore, a tilt range of the shaft 18 in the state, in which the drive disk 22 and the stationary disk 14 are in close contact with each other, is increased. The tilted posture of the shaft 18, which is indicated by the dotted line in FIG. 16, is a posture where a line, which is perpendicular to a reference plane (i.e., a plane of the sliding surface 220 of the drive disk 22), intersects the central axis CL by a predetermined angle θα.

As shown in FIG. 15, the stationary-side insertion hole 143 has a second small diameter portion 143a and a second large diameter portion 143b which extend in the axial direction DRa. The second small diameter portion 143a is a portion of the stationary-side insertion hole 143 located on the one side in the axial direction DRa. A hole diameter ϕs1 of the second small diameter portion 143a is slightly larger than the shaft diameter ϕa. Furthermore, the second large diameter portion 143b is another portion of the stationary-side insertion hole 143 located on the other side in the axial direction DRa. A hole diameter ϕs2 of the second large diameter portion 143b is larger than the hole diameter ϕs1 of the second small diameter portion 143a. A length of the second small diameter portion 143a and a length of the second large diameter portion 143b measured in the axial direction DRa are substantially equal to each other.

With this configuration, even when the shaft 18 is tilted from the designed target posture of the shaft 18 to the posture indicated by the dotted line due to some reason, the tilting of the stationary disk 14 along with the shaft 18 is limited. Therefore, a tilt range of the shaft 18 in the state, in which the drive disk 22 and the stationary disk 14 are in close contact with each other, is increased.

In the present embodiment, the hole diameter ϕr1 of the first small diameter portion 223a and the hole diameter ϕs1 of the second small diameter portion 143a are substantially equal to each other. However, the present disclosure is not limited to this, and the hole diameter ϕr1 of the first small diameter portion 223a and the hole diameter ϕs1 of the second small diameter portion 143a may be different from each other. In the present embodiment, the hole diameter ϕr2 of the first large diameter portion 223b and the hole diameter ϕs2 of the second large diameter portion 143b are substantially equal to each other. However, the present disclosure is not limited to this, and the hole diameter ϕr2 of the first large diameter portion 223b and the hole diameter ϕs2 of the second large diameter portion 143b may be different from each other.

Figure 17:
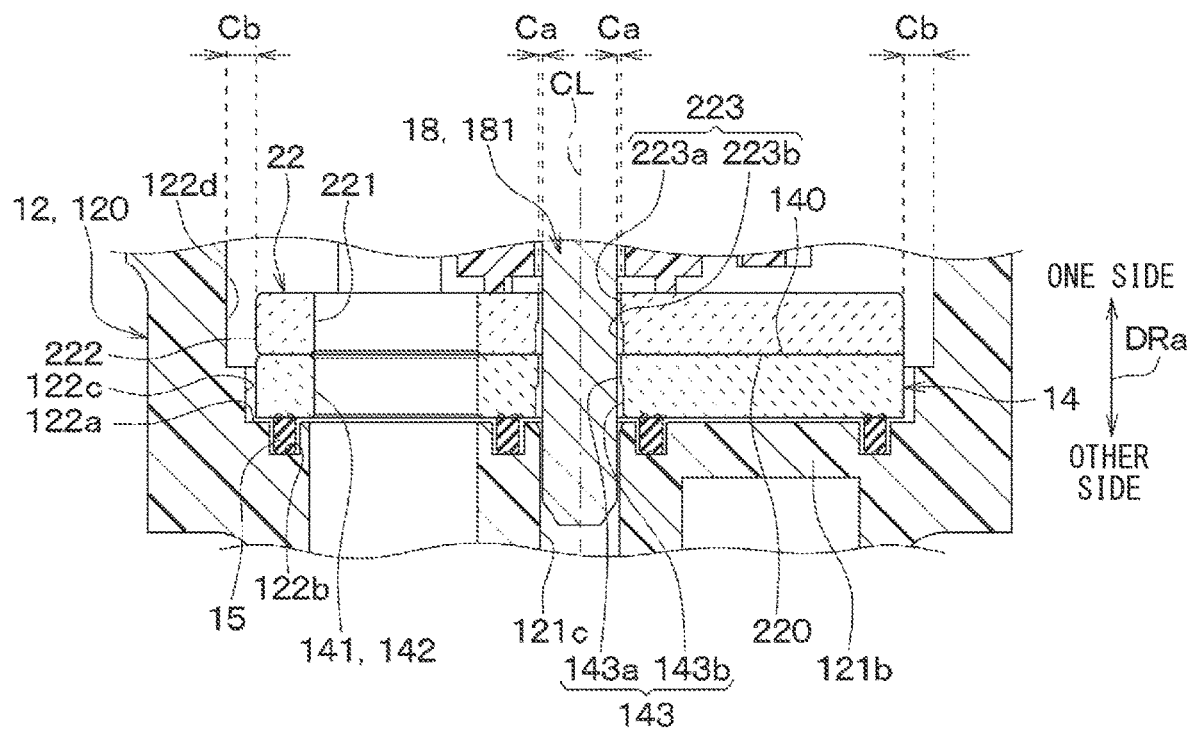
FIG. 17 is a schematic enlarged view of a portion XVII in FIG. 3.

Furthermore, as shown in FIG. 17, a first clearance Ca between the first small diameter portion 223a of the drive-side insertion hole 223 and the shaft 18 is set to be equal to or smaller than a second clearance Cb between the second disk opposing portion 122d and the disk peripheral wall 222. The second clearance Cb of the present embodiment is set to be larger than a clearance between the first large diameter portion 223b of the drive-side insertion hole 223 and the shaft 18. The first clearance Ca is a smallest dimension of the gap between the first small diameter portion 223a and the shaft 18 in a state where the rotational center of the drive disk 22 coincides with the central axis CL of the shaft 18. The second clearance Cb is a smallest dimension of the gap between the second disk opposing portion 122d and the disk peripheral wall 222 in the state where the rotational center of the drive disk 22 coincides with the central axis CL. of the shaft 18.

Next, an operation of the valve device 10 of the present embodiment will be described. In the valve device 10, as shown in FIGS. 1, 2 and 3, the fluid flows from the inlet 12a into the inlet-side space 12d, as indicated by an arrow Fi. In a case where the first passage hole 141 is opened, the fluid flows from the inlet-side space 12d into the first outlet-side space through the first passage hole 141. The fluid, which is supplied into the first outlet-side space, flows from the first outlet-side space to the outside of the valve device 10 through the first outlet 12b, as indicated by an arrow F1o. In this case, the flow rate of the fluid, which passes through the first passage hole 141, is determined according to the opening degree of the first passage hole 141. That is, the flow rate of the fluid, which flows from the inlet 12a to the first outlet 12b through the first passage hole 141, is increased when the opening degree of the first passage hole 141 is increased.

In contrast, in another case where the second passage hole 142 is opened, the fluid flows from the inlet-side space 12d to the second outlet-side space through the second passage hole 142. The fluid, which is supplied into the second outlet-side space, flows from the second outlet-side space to the outside of the valve device 10 through the second outlet 12c, as indicated by an arrow F2o. In this case, the flow rate of the fluid, which passes through the second passage hole 142, is determined according to the opening degree of the second passage hole 142. That is, the flow rate of the fluid, which flows from the inlet 12a to the second outlet 12c through the second passage hole 142, is increased when the opening degree of the second passage hole 142 is increased.

The rotor 20 of the valve device 10 described above includes: the drive disk 22; and the lever 24 that couples between the drive disk 22 and the shaft 18 in a state where the drive disk 22 is displaceable in the axial direction DRa of the shaft 18. The compression spring 26, which urges the rotor 20 against the stationary disk 14, is placed between the holder 182 and the rotor 20. With this configuration, a sufficient load for urging the rotor 20 against the stationary disk 14 can be ensured. Therefore, unintended leakage of the fluid from a gap between the drive disk 22 and the stationary disk 14 can be limited by maintaining the contact state between the drive disk 22 and the stationary disk 14.

In addition, the drive disk 22 is configured such that the hole diameter of the at least one of the two end portions of the drive-side insertion hole 223, which are opposite to each other in the axial direction DRa, is larger than the smallest hole diameter of the drive-side insertion hole 223. Specifically, the hole diameter $\phi r1$ of the first small diameter portion 223a, which is located at the one end of the drive-side insertion hole 223 in the axial direction DRa, is the smallest hole diameter of the drive-side insertion hole 223, and the hole diameter $\phi r2$ of the first large diameter portion 223b, which is located at the other end of the drive-side insertion hole 223 in the axial direction DRa, is larger than the hole diameter $\phi r1$ of the first small diameter portion 223a.

With this configuration, the position of the rotational center of the drive disk 22 is limited by the first small diameter portion 223a, which has the smallest hole diameter in the drive-side insertion hole 223, so that the deviation between the rotational center of the drive disk 22 and the central axis CL of the shaft 18 is limited. Furthermore, since the hole diameter of the at least one of the two end portions of the drive-side insertion hole 223, which are opposite to each other in the axial direction DRa, is larger than the hole diameter $\phi r1$ of the first small diameter portion 223a, a tiltable range of the shaft 18 relative to the rotor 20 is increased. Thereby, even when the shaft 18 is tilted due to some reason, a sufficient degree of close contact between the drive disk 22 and the stationary disk 14 can be ensured.

Thus, according to the valve device 10 described above, unintended leakage of the fluid caused by the change in the posture of the shaft 18 can be limited while the deviation between the rotational center of the drive disk 22 and the central axis CL of the shaft 18 is limited.

Furthermore, the valve device 10 of the present embodiment can achieve the following advantages.

(1) The stationary disk 14 is configured such that the hole diameter of the at least one of the two end portions of the stationary-side insertion hole 143, which are opposite to each other in the axial direction DRa, is larger than the smallest hole diameter of the stationary-side insertion hole 143. Specifically, the hole diameter $\phi s1$ of the second small diameter portion 143a, which is located at the one end of the stationary-side insertion hole 143 in the axial direction DRa, is the smallest hole diameter of the stationary-side insertion hole 143, and the hole diameter $\phi s2$ of the second large diameter portion 143b, which is located at the other end of the stationary-side insertion hole 143 in the axial direction DRa, is larger than the hole diameter $\phi s1$ of the second small diameter portion 143a. With this configuration, the position of the center of the stationary disk 14 is limited by the second small diameter portion 143a, which has the smallest hole diameter in the stationary-side insertion hole 143, so that the deviation between the center of the stationary disk 14 and the central axis CL of the shaft 18 is limited. Furthermore, since the hole diameter of the at least one of the two end portions of the stationary-side insertion hole 143, which are opposite to each other in the axial direction DRa, is larger than the hole diameter of the second small diameter portion 143a, so that a tiltable range of the shaft 18 relative to the stationary disk 14 is increased. Thereby, even when the shaft 18 is tilted due to some reason, a sufficient degree of close contact between the drive disk 22 and the stationary disk 14 can be ensured.

(2) The inner wall of each of the drive-side insertion hole 223 and the stationary-side insertion hole 143 is shaped in the stepped form. With this configuration, it is possible to obtain the drive disk 22 and the stationary disk 14, in each of which the hole diameter of the at least one of the two end portions of the insertion hole 223, 143, which are opposite to each other in the axial direction DRa, is larger than the smallest hole diameter of the insertion hole 223, 143.

(3) The first clearance Ca between the first small diameter portion 223a of the drive-side insertion hole 223 and the shaft 18 is set to be equal to or smaller than the second clearance Cb between the second disk opposing portion 122d and the disk peripheral wall 222. With this configuration, it is possible to limit locking of the drive disk 22 caused by contact between the second disk opposing portion 122d of the housing 12 and the disk peripheral wall 222 of the drive disk 22 at the time when the rotational center of the drive disk 22 is deviated from the central axis CL of the shaft 18.

(4) The gasket 15, which seals the gap between the stationary disk 14 and the mounting portion 122a, is placed between the stationary disk 14 and the mounting portion 122a. According to this configuration, leakage of the fluid from the gap between the stationary disk 14 and the mounting portion 122a can be limited.

(5) The shaft 18 includes: the shaft core 181 that is made of the metal and includes the central axis CL while the shaft core 181 extends in the axial direction DRa; and the holder 182 that is made of the resin and is coupled to the shaft core 181. The holder 182 is configured to receive the urging force of the first torsion spring 28 and the urging force of the second torsion spring 30. According to this configuration, the rigidity and accuracy (that is, straightness) of the shaft 18 can be ensured as compared with the case where the entire shaft 18 is made of a resin material. Moreover, when the holder 182 is made of the resin, it is possible to realize the shaft 18 that is lightweight and has a complex shape. In particular, by ensuring the straightness of the shaft 18, a clearance of, for example, the bearing 124g can be reduced. Therefore, a positional deviation of the shaft 18 in the radial direction (i.e., the radial direction DRr) of the shaft 18 can be limited.

(6) The shaft 18 extends through the stationary disk 14 and the drive disk 22 and is rotatably supported by the housing 12. By adopting the structure in which the shaft 18 extends through the stationary disk 14 and the drive disk 22, the stationary disk 14 and the drive disk 22 can be centered by the shaft 18. As a result, the positional deviation of the stationary disk 14 and the drive disk 22 in the radial direction can be limited. This is effective for limiting the variations in the opening degree of the respective passage holes 141, 142.

(7) In the valve device 10, the drive disk 22 is coupled to the shaft 18 in the state where the drive disk 22 is displaceable in the axial direction DRa. Therefore, even when the second torsion spring 30 is placed between the shaft 18 and the lever 24, the surface-to-surface contact between the sliding surface 220 of the drive disk 22 and the stationary disk 14 can be maintained satisfactorily.

First Modification of First Embodiment

The shape of the drive-side insertion hole 223 may be different from the above described shape of the drive-side insertion hole 223 as long as the hole diameter of at least one of the two end portions of the drive-side insertion hole 223, which are opposite to each other in the axial direction DRa, is larger than the smallest hole diameter of the drive-side insertion hole 223. This is also true for the stationary-side insertion hole 143.

Figure 18:
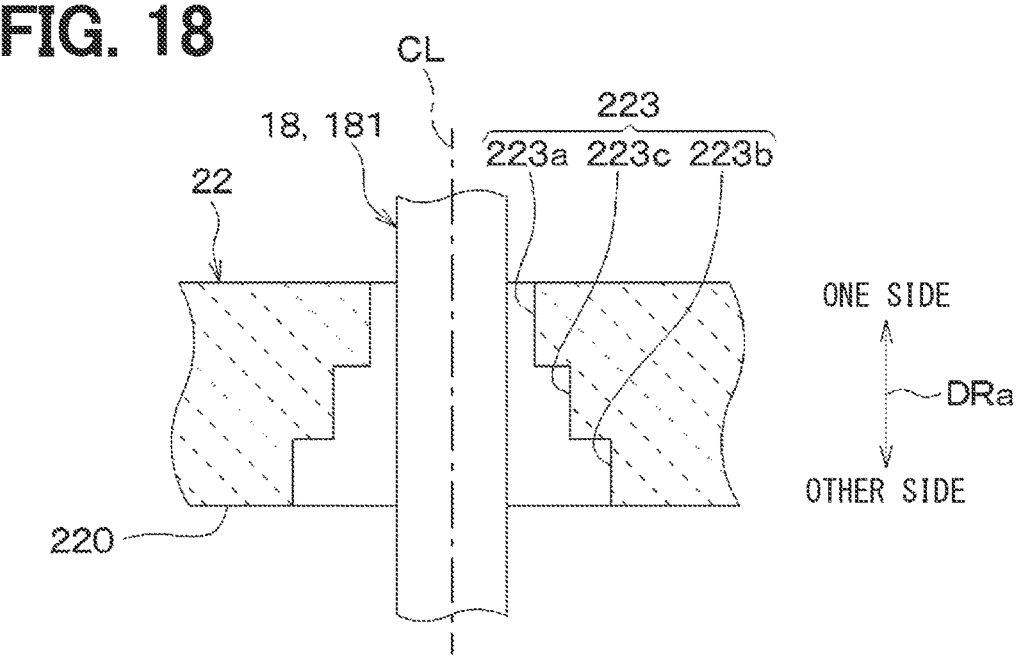
FIG. 18 is an explanatory diagram for explaining an insertion hole of a drive disk of a first modification of the first embodiment.

For example, as shown in FIG. 18, the drive-side insertion hole 223 may have an intermediate portion 223c between the first small diameter portion 223a and the first large diameter portion 223b while a hole diameter of the intermediate portion 223c is larger than the first small diameter portion 223a and is smaller than the first large diameter portion 223b.

Second Modification of First Embodiment

Figure 19:
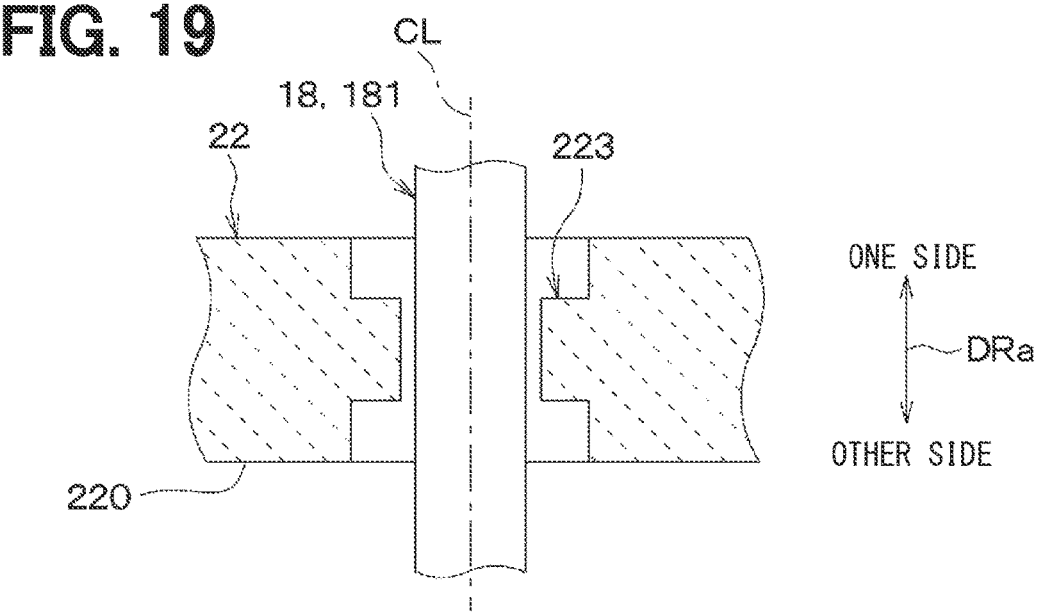
FIG. 19 is an explanatory diagram for explaining an insertion hole of a drive disk of a second modification of the first embodiment.

For example, as shown in FIG. 19, the drive-side insertion hole 223 may have a smallest hole diameter portion between the two end portions of the drive-side insertion hole 223, which are opposite to each other in the axial direction DRa, while the hole diameter of the smallest hole diameter portion is the smallest at the drive-side insertion hole 223. In this case, the hole diameters of the two end portions of the drive-side insertion hole 223, which are opposite to each other in the axial direction DRa, may be substantially equal to each other or may be different from each other.

Other Modifications of First Embodiment

The drive-side insertion hole 223 may be configured such that the first small diameter portion 223a is placed on the other side in the axial direction DRa, and the first large diameter portion 223b is placed on the one side in the axial direction DRa.

Second Embodiment

Next, a second embodiment will be described with reference to FIG. 20. In the valve device 10 of the present embodiment, the shapes of the insertion holes of the drive disk 22 and the stationary disk 14, through which the shaft 18 is inserted, are different from those of the first embodiment. In the present embodiment, points, which are different from the first embodiment, will be mainly described.

Figure 20:
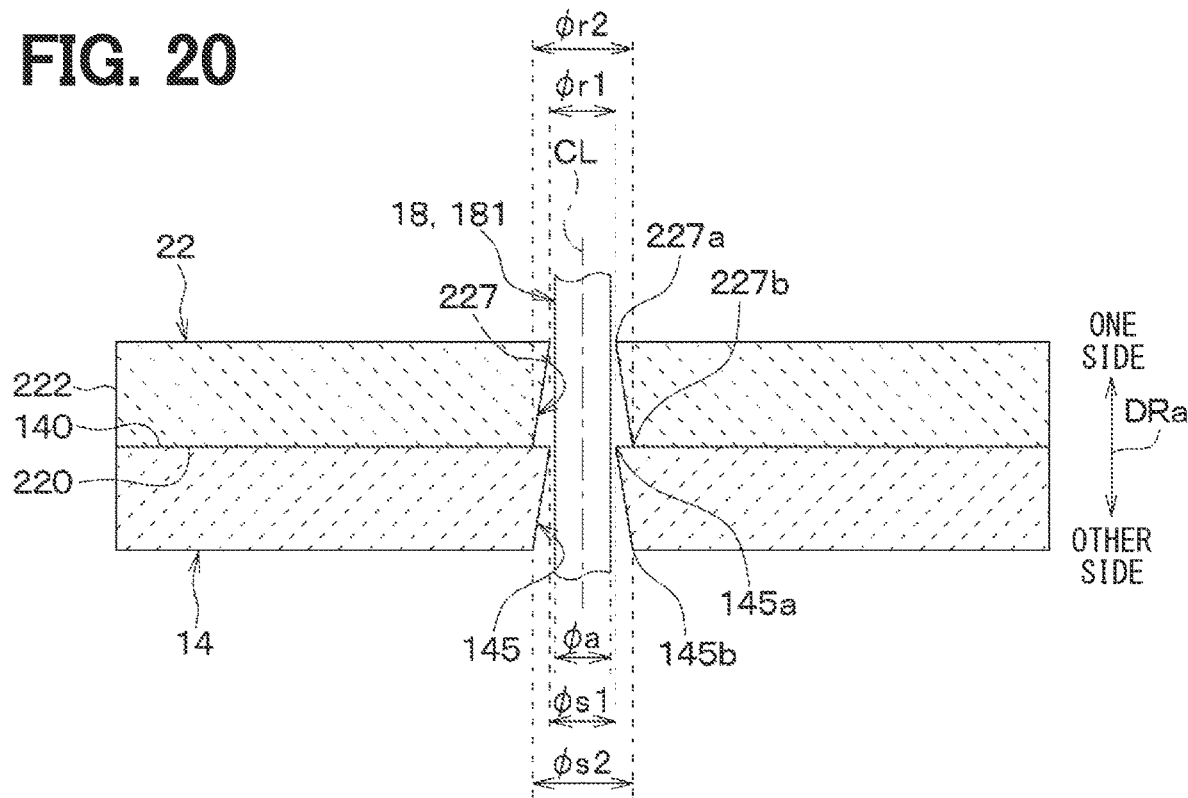
FIG. 20 is an explanatory diagram for explaining an insertion hole of each of a drive disk and a stationary disk, through which the shaft is inserted, in a valve device of a second embodiment.

As shown in FIG. 20, an inner wall of each of the drive-side insertion hole 227 and the stationary-side insertion hole 145 is shaped in a tapered form. In other words, each of the drive-side insertion hole 227 and the stationary-side insertion hole 145 is tilted relative to the central axis CL, so that the hole diameter of each of the drive-side insertion hole 227 and the stationary-side insertion hole 145 is progressively increased or decreased in the axial direction DRa.

Specifically, a hole inner wall of the drive-side insertion hole 227 is tilted relative to the axial direction DRa. A hole diameter ϕr1 of one end portion 227a of the drive-side insertion hole 227, which faces the one side in the axial direction DRa, is the smallest at the drive-side insertion hole 227, and a hole diameter ϕr2 of the other end portion 227b of the drive-side insertion hole 227, which faces the other side in the axial direction DRa, is larger than the hole diameter ϕr1 of the one end portion 227a. The hole diameter ϕr2 of the other end portion 227b of the drive-side insertion hole 227, which faces the other side in the axial direction DRa, is the largest at the drive-side insertion hole 227.

Furthermore, a hole inner wall of the stationary-side insertion hole 145 is tilted relative to the axial direction DRa. A hole diameter ϕs1 of one end portion 145a of the stationary-side insertion hole 145, which faces the one side in the axial direction DRa, is the smallest at the stationary-side insertion hole 145, and a hole diameter ϕs2 of the other end portion 145b of the stationary-side insertion hole 145, which faces the other side in the axial direction DRa, is larger than the hole diameter ϕs1 of the one end portion 145a. The hole diameter ϕs2 of the other end portion 145b is the largest at the stationary-side insertion hole 145.

With this configuration, when the shaft 18 is tilted from the designed target posture of the shaft 18 due to some reason, it is possible to limit the tilting of the drive disk 22 and the stationary disk 14 along with the shaft 18. Therefore, the sufficient degree of close contact between the drive disk 22 and the stationary disk 14 is maintained.

The rest of the configuration of the second embodiment is the same as that of the first embodiment. The valve device 10 of the present embodiment can achieve the advantages, which are achieved by the common configuration or equivalent configuration that is common to or equivalent to the first embodiment described above.

(1) The inner wall of each of the drive-side insertion hole 227 and the stationary-side insertion hole 145 is shaped in the tapered form. Even with this configuration, it is possible to obtain the drive disk 22 and the stationary disk 14, in each of which the hole diameter of the at least one of the two end portions of the insertion hole 227, 145, which are opposite to each other in the axial direction DRa, is larger than the smallest hole diameter of the insertion hole 227, 145.

Modifications of Second Embodiment

The shape of the drive-side insertion hole 227 may be different from the above described shape of the drive-side insertion hole 227 as long as the hole diameter of at least one of the two end portions of the drive-side insertion hole 227, which are opposite to each other, is larger than the smallest hole diameter of the drive-side insertion hole 227. This is also true for the stationary-side insertion hole 145.

Figure 21:
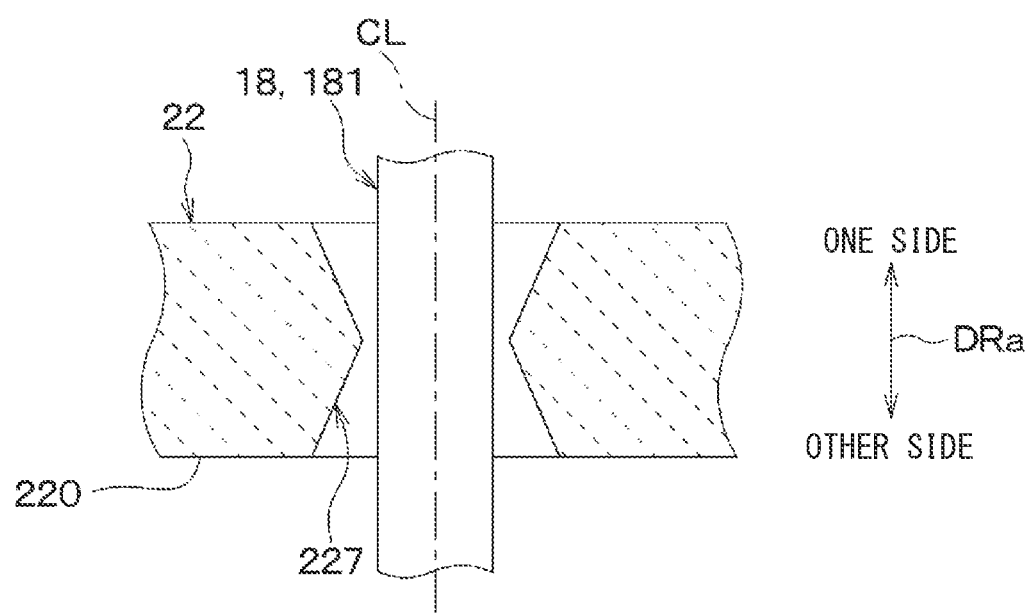
FIG. 21 is an explanatory diagram for explaining an insertion hole of a drive disk of a modification of the second embodiment.

For example, as shown in FIG. 21, the drive-side insertion hole 223 may have a smallest hole diameter portion between the two end portions of the drive-side insertion hole 223, which are opposite to each other in the axial direction DRa, while the hole diameter of the smallest hole diameter portion is the smallest at the drive-side insertion hole 223. In this case, the hole diameters of the two end portions of the drive-side insertion hole 223, which are opposite to each other in the axial direction DRa, may be substantially equal to each other or may be different from each other.

The drive-side insertion hole 227 may be configured such that the hole diameter of the other side of the drive-side insertion hole 227, which faces the other side in the axial direction DRa, is the smallest at the drive-side insertion hole 227, and the hole diameter of the one side of the drive-side insertion hole 227, which faces the one side in the axial direction DRa, is the largest at the drive-side insertion hole 227. The drive-side insertion hole 227 may be configured such that the drive-side insertion hole 227 is not tilted relative to the central axis CL along the entire axial extent of the drive-side insertion hole 227, and a portion of the drive-side insertion hole 227 may be tilted relative to the axial direction DRa.

Other Embodiments

Although the representative embodiments of the present disclosure have been described above, the present disclosure is not limited to the above-described embodiments. The components of the valve device 10 are not limited to the above-described components and may be different from the above-described components.

In the embodiments described above, there is described the example where the drive-side insertion hole 223 and the stationary-side insertion hole 143 are identically shaped. Alternatively, the shape of the drive-side insertion hole 223 and the shape of the stationary-side insertion hole 143 may be different from each other.

In the embodiments described above, the two end portions of the shaft 18, which are opposite to each other in the axial direction DRa, are rotatably supported by the housing 12. However, the support structure of the shaft 18 is not limited to this. For example, the other side of the shaft 18, which faces the other side in the axial direction DRa, may be supported by the stationary-side insertion hole 143 of the stationary disk 14. Furthermore, in the embodiments described above, the stationary disk 14 has the stationary-side insertion hole 143. However, the present disclosure is not limited to this configuration, and the stationary-side insertion hole 143 may be eliminated from the stationary disk 14.

As described in the above embodiments, it is desirable that the clearance between the shaft 18 and the smallest diameter portion of the drive-side insertion hole 223, which has the smallest hole diameter at the drive-side insertion hole 223, is set to be equal to or smaller than the clearance between the second disk opposing portion 122d and the disk peripheral wall 222. However, the present disclosure is not limited to this configuration. For example, the largest clearance between the shaft 18 and the smallest diameter portion of the drive-side insertion hole 223, which has the smallest hole diameter at the drive-side insertion hole 223, may be larger than the smallest clearance between the second disk opposing portion 122d and the disk peripheral wall 222.

As described in the embodiments described above, it is desirable that the gasket 15, which seals the gap between the stationary disk 14 and the mounting portion 122a, is placed between the stationary disk 14 and the mounting portion 122a. However, the present disclosure is not limited to this configuration, and the gasket 15 may be eliminated.

As described in the above embodiments, it is desirable that the shaft 18 includes the shaft core 181 made of the metal and the holder 182 made of the resin. However, the present disclosure is not limited to this. For example, the shaft 18 may be formed such that the shaft core 181 and the holder 182 are made of one of the metal material and the resin material. The shaft 18 may be formed as a shaft, in which a structure that corresponds to the shaft core 181, is added to the holder 182.

As in the embodiments described above, it is desirable that the valve device 10 has the torsion springs 28, 30. However, the present disclosure is not limited to this configuration. The torsion springs 28, 30 may be eliminated.

In the above-described embodiments, there is exemplified that the two end portions of the shaft 18 are rotatably supported by the housing 12. However, the valve device 10 is not limited to this. In the valve device 10, for example, one end portion of the shaft 18 may be rotatably supported by the stationary disk 14. Furthermore, in the valve device 10, for example, only one of the two end portions of the shaft 18 may be rotatably supported by the housing 12.

In the above-described embodiment, the compression spring 26 urges the rotor 20 against the stationary disk 14. However, the valve device 10 of the present disclosure is not limited to this configuration. The valve device 10 may be configured such that, for example, an elastomer, which is shaped in a cylindrical tubular form and is resiliently deformable in the axial direction DRa of the shaft 18, may be used to urge the rotor 20 against the stationary disk 14. Furthermore, the valve device 10 may be configured such that a pressure difference between the inlet-side space 12d and the outlet-side space 12e is used to urge the rotor 20 against the stationary disk 14. As indicated above, the compression spring 26 is not an essential component in the valve device 10.

As described in the above embodiments, it is desirable that in the valve device 10, the lever 24 includes the engaging portion which is configured to engage with the shaft 18 in the state where the second torsion spring 30 is interposed between the engaging portion and the shaft 18. However, this engaging portion may be eliminated.

In the above-described embodiments, there is exemplified that the valve device 10 is formed as the three-way valve.

However, the valve device 10 is not limited to the three-way valve. The valve device 10 of the present disclosure may be configured as, for example, a flow rate adjusting valve or an on-off valve which has one fluid inlet and one fluid outlet. In this case, one flow passage hole is formed at the stationary disk 14. The valve device 10 of the present disclosure may be, for example: a multi-way valve having one fluid inlet and three or more fluid outlets; a multi-way valve having three or more fluid inlets and one fluid outlet; or a multi-way valve having a plurality of fluid inlets and a plurality of fluid outlets.

In the above-described embodiments, there is described the example where the valve device 10 of the present disclosure is applied as the control valve for the vehicle. However, the valve device 10 of the present disclosure may be applied as a control valve for other machines that is other than the vehicle.

Needless to say, in the above-described embodiments, the components of the embodiment(s) are not necessarily essential except when it is clearly indicated that they are essential and when they are clearly considered to be essential in principle.

In the above-described embodiments, when the numerical values, such as the number, numerical value, quantity, range, etc. of the components of the embodiment(s) are mentioned, the numerical values are not limited to those described in the embodiment(s) except when it is clearly indicated that the numeric values are essential and when the numeric values are clearly considered to be essential in principle.

In the above-described embodiments, when a shape, a positional relationship, etc. of the component(s) is mentioned, the shape, positional relationship, etc. are not limited to those described in the embodiment(s) unless otherwise specified or limited in principle to the those described in the embodiment(s).

What is claimed is:

1. A valve device comprising:
   a housing that forms a fluid passage at an inside of the housing, wherein the fluid passage is configured to conduct a fluid through the fluid passage;
   a stationary disk that is shaped in a plate form and is fixed at the inside of the housing, wherein the stationary disk has at least one passage hole which is configured to conduct the fluid through the at least one passage hole;
   a drive device that is configured to output a rotational force;
   a shaft that is configured to be rotated about a central axis, which is predetermined, by the rotational force;
   a rotor that is configured to increase or decrease an opening degree of the at least one passage hole in response to rotation of the shaft; and
   an urging member that is configured to urge the rotor against the stationary disk, wherein:
   the rotor includes:
      a drive disk that is shaped in a plate form and is configured to slide relative to the stationary disk in a state where the drive disk is opposed to the stationary disk; and
      a lever that is fixed to the drive disk and couples between the drive disk and the shaft to enable integral rotation of the drive disk and the shaft in a state where the drive disk is displaceable in an axial direction of the shaft;
   the drive disk has a drive-side insertion hole through which the shaft is inserted;
   an outer diameter of an inserted portion of the shaft, which is inserted through the drive-side insertion hole, is defined as a shaft diameter;
   a hole diameter of the drive-side insertion hole is larger than the shaft diameter, and a hole diameter of at least one of two end portions of the drive-side insertion hole, which are opposite to each other in the axial direction, is larger than a smallest hole diameter of the drive-side insertion hole; and
   the hole diameter of the at least one of the two end portions of the drive-side insertion hole and the smallest hole diameter of the drive-side insertion hole are set to enable tilting of the shaft to a maximum tilt angle within a tiltable range of the shaft relative to the stationary disk, while keeping the drive disk in contact with and parallel to the stationary disk.

2. The valve device according to claim 1, wherein:
   the stationary disk has a stationary-side insertion hole through which the shaft is inserted; and
   a hole diameter of the stationary-side insertion hole is larger than the shaft diameter, and a hole diameter of at least one of two end portions of the stationary-side insertion hole, which are opposite to each other in the axial direction, is larger than a smallest hole diameter of the stationary-side insertion hole.

3. The valve device according to claim 2, wherein an inner wall of each of the drive-side insertion hole and the stationary-side insertion hole is shaped in a stepped form.

4. The valve device according to claim 2, wherein an inner wall of each of the drive-side insertion hole and the stationary-side insertion hole is shaped in a tapered form.

5. The valve device according to claim 1, wherein:
   the housing has a disk opposing wall that is opposed to the drive disk in a direction which is perpendicular to the axial direction;
   the drive disk has a disk peripheral wall that is opposed to the disk opposing wall; and
   a clearance between the shaft and a smallest diameter portion of the drive-side insertion hole, which has the smallest hole diameter at the drive-side insertion hole, is set to be equal to or smaller than a clearance between the disk opposing wall and the disk peripheral wall.

6. The valve device according to claim 1, wherein:
   the drive disk has a sliding surface that is opposed to the stationary disk;
   the housing has a mounting portion that contacts a back surface of the stationary disk which is opposite to a contact surface of the stationary disk placed in contact with the sliding surface; and
   a gasket is placed between the stationary disk and the mounting portion and is configured to seal a gap between the stationary disk and the mounting portion.

7. The valve device according to claim 1, wherein:
   an inner wall of the drive-side insertion hole of the drive disk is shaped in a stepped form; and
   the stepped form of the inner wall of the drive-side insertion hole includes a first step portion and a second step portion, the second step portion has a larger diameter than the first step portion, and the second step portion is closer to the stationary disk in the axial direction than the first step portion.

8. The valve device according to claim 7, wherein:
   a length of the first step portion and a length of a second step portion in the axial direction are equal to each other.

9. The valve device according to claim 1, wherein:
an inner wall of the drive-side insertion hole of the drive disk is shaped in a tapered form; and
a hole diameter defined by the inner wall of the drive-side insertion hole of the drive disk progressively increases in the axial direction toward the stationary disk.

\* \* \* \* \*